US 9,724,876 B2

(12) United States Patent
Cheverton et al.

(10) Patent No.: US 9,724,876 B2
(45) Date of Patent: Aug. 8, 2017

(54) OPERATIONAL PERFORMANCE ASSESSMENT OF ADDITIVE MANUFACTURING

(71) Applicant: GENERAL ELECTRIC COMPANY, Schenectady, NY (US)

(72) Inventors: Mark Allen Cheverton, Malta, NY (US); Christopher Allen Nafis, Rexford, NY (US); Robert William Tait, Niskayuna, NY (US); Russell Ryder Dennison, Glenville, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 466 days.

(21) Appl. No.: 14/106,003

(22) Filed: Dec. 13, 2013

(65) Prior Publication Data
US 2015/0165683 A1   Jun. 18, 2015

(51) Int. Cl.
*G06T 7/00* (2017.01)
*B29C 67/00* (2017.01)
*B33Y 50/02* (2015.01)

(52) U.S. Cl.
CPC ...... *B29C 67/0088* (2013.01); *B29C 67/0059* (2013.01); *G06T 7/0004* (2013.01); *B33Y 50/02* (2014.12); *G06T 2207/30164* (2013.01)

(58) Field of Classification Search
None
See application file for complete search history.

(56) References Cited

U.S. PATENT DOCUMENTS

| | | | | |
|---|---|---|---|---|
| 2008/0174631 A1* | 7/2008 | Habashi | ............... | B41J 2/16579 347/30 |
| 2009/0298017 A1* | 12/2009 | Boerjes | ............... | A61B 5/4547 433/214 |
| 2010/0007692 A1* | 1/2010 | Vanmaele | ............ | B29C 67/0055 347/21 |
| 2011/0032554 A1* | 2/2011 | Matsuhira | ................ | H04N 1/58 358/1.9 |
| 2011/0061591 A1* | 3/2011 | Stecker | ................ | B22F 3/1055 118/663 |

(Continued)

OTHER PUBLICATIONS

On Line Model Accuracy Inspection of Model Maker Rapid Prototyping Using Vision Technology. J.-Y. Jeng, J.-C. Wang, T. T. Lin and W. P. Yang. 2001.*

(Continued)

*Primary Examiner* — Delomia L Gilliard
(74) *Attorney, Agent, or Firm* — John P. Darling

(57) ABSTRACT

A method for assessment of operational performance of a 3D manufacturing apparatus is provided. Images are obtained, in real-time during a 3D polymer printing build process in which at least one structure is built by the 3D manufacturing apparatus, the images being of an area of a build platform on which the at least one structure is built. The obtained images are evaluating, and it is determined, based on the evaluating, whether an operational flaw with the 3D manufacturing apparatus has occurred. Operational flaws include errors in the operation of the 3D manufacturing apparatus and/or component thereof, as evidenced by, for instance, distortions or other errors in the structure(s) being built and/or materials being used.

23 Claims, 13 Drawing Sheets

(56) References Cited

U.S. PATENT DOCUMENTS

| | | | |
|---|---|---|---|
| 2014/0044822 A1* | 2/2014 | Mulliken | B29C 67/0088 425/113 |
| 2015/0024233 A1* | 1/2015 | Gunther | G05B 19/41875 428/601 |
| 2015/0045928 A1* | 2/2015 | Perez | B29C 67/0088 700/110 |
| 2015/0082498 A1* | 3/2015 | Meyer | G01Q 30/02 850/1 |

OTHER PUBLICATIONS

Desktop Rapid Prototyping System with Supervisory Control and Monitoring Through Internet . Ren Luo et al. Dec. 2001.*

Jeng, J.-Y and Yang, W.P.; "On-Line layer profile dimensions measurement of model maker rapid prototyping using vision technology," International Journal of Advanced Manufacturing Technology, v. 17, No. 2, p. 125-133, 2001.

Jeng, J.-Y, et al.; "On-line layer monitoring and defect inspection of model maker rapid prototyping system using vision technology," Journal of the Chinese Society of Mechanical Engineers, Transactions of the Chinese Institute of Engineers, Series C/Chung-Kuo Chi Hsueh Kung Ch'eng Hsuebo Pao, v. 20, No. 6, p. 575-584, 1999.

Jeng, J.-Y, et al; "On line model accuracy inspection of model maker rapid prototyping using vision technology," International Journal of Advanced Manufacturing Technology, v. 17, No. 11, p. 825-834, 2001.

"Do you know everything about SLM®?", SLM Solutions GmbH, http://www.slm-solutions.com/cms/upload/pdf/121004_SLM_Gesamt.pdf.

"Ahead! Topologically optimized components in aviation", Concept Laser, http://www.concept-laser.de/fileadmin/downloads_allg/101026_aerospace_DE_EN_lowres.pdf.

* cited by examiner

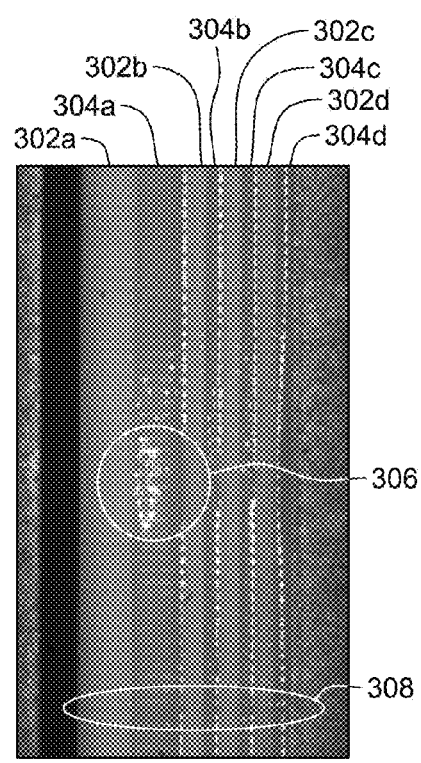 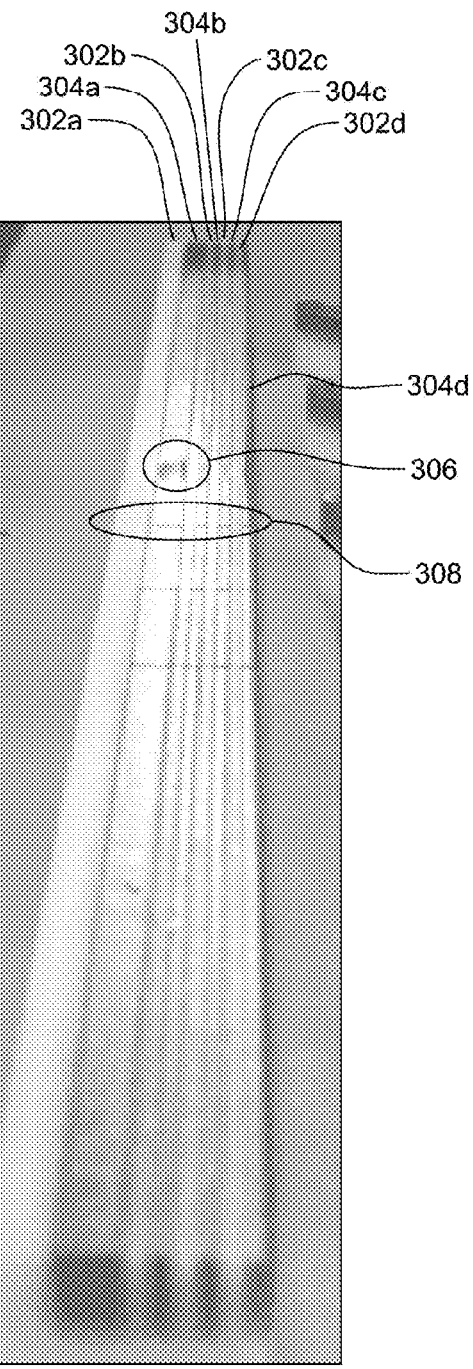
FIG. 3A
FIG. 3B

OPERATIONAL PERFORMANCE ASSESSMENT OF ADDITIVE MANUFACTURING

BACKGROUND

Additive manufacturing is a process by which a three-dimensional structure is built, usually in a series of layers, based on a digital model of the structure. The process is sometimes referred to as three-dimensional (3D) printing or 3D rapid prototyping, and the term "print" is often used even though some examples of the technology rely on sintering or melting/fusing by way of an energy source to form the structure, rather than "printing" in the traditional sense where material is deposited at select locations. Examples of additive manufacturing techniques include Fused Deposition Modeling, Electron Beam Melting, Laminated Object Manufacturing, Selective Laser Sintering (including Direct Metal Laser Sintering, also referred to as Direct Metal Laser Melting, also referred to as Selective Laser Melting), and Stereolithography, among others. Although 3D printing technology is continually developing, the process to build a structure layer-by-layer is relatively slow, with some builds taking several days to complete.

One of the disadvantages of current additive manufacturing processing relates to quality assurance. There is typically some amount of analysis to determine whether the produced part meets the manufacturing thresholds and design criteria. In some examples, the parts can be evaluated using non-destructive engineering, such as scanning, to ensure that the part meets the design thresholds. However in other cases, the part may have to be dissected in order to test whether a certain lot of products or a sampling has satisfied the design limits. This can lead to considerable inefficiency when, for example, it is later determined that a production lot is defective due to a machining or design problem.

There have been some attempts to alleviate the aforementioned problem. In one example, for selective laser sintering, images are obtained to provide a crude estimation of the production process for the large features. A scoring system is utilized to determine if a part fails. However, such a system is unable to determine the root cause analysis of the failure. In the traditional 3D printing area, there are currently limited techniques.

For at least the reasons recited, there is a growing need for real-time inspection systems and processes that can evaluate the additive manufacturing products and assess the quality of the products and health of the systems.

BRIEF DESCRIPTION

Assurance that a build process is progressing to plan can be important, given the resources, both in time and material, that are expended. In accordance with aspects described herein, a method is provided for assessment of operational performance of a 3D manufacturing apparatus. The method includes, for instance: obtaining, in real-time during a 3D polymer printing build process in which at least one structure is built by the 3D manufacturing apparatus, images of an area of a build platform on which the at least one structure is built; evaluating, by a processor, the obtained images; and determining, based on the evaluating, whether an operational flaw with the 3D manufacturing apparatus has occurred.

Additionally, a system is provided for assessment of operational performance of an additive manufacturing apparatus. The system includes, for instance: a memory; and a processor in communication with the memory, wherein the system is configured to perform: obtaining, in real-time during an additive manufacturing build process in which at least one structure is built by the additive manufacturing apparatus, images of an area of a build platform on which the at least one structure is built; evaluating, by a processor, the obtained images; and determining, based on the evaluating, whether an operational flaw with the additive manufacturing apparatus has occurred.

Further, a computer program product is provided for assessment of operational performance of a 3D manufacturing apparatus. The computer program product includes, for instance: a non-transitory computer readable storage medium readable by a processor and storing instructions for execution by the process to perform a method comprising: obtaining, in real-time during a 3D polymer printing build process in which at least one structure is built by the 3D manufacturing apparatus, images of an area of a build platform on which the at least one structure is built; evaluating the obtained images; and determining, based on the evaluating, whether an operational flaw with the 3D manufacturing apparatus has occurred.

Additional features and advantages are realized through the concepts of aspects of the present invention. Other embodiments and aspects of the invention are described in detail herein and are considered a part of the claimed invention.

DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A & 3B depict images of overhead and angled-overhead views of a witness fence printed by an additive manufacturing apparatus to facilitate operational performance assessment of the additive manufacturing apparatus, in accordance with aspects described herein;

DETAILED DESCRIPTION

Figure 1:
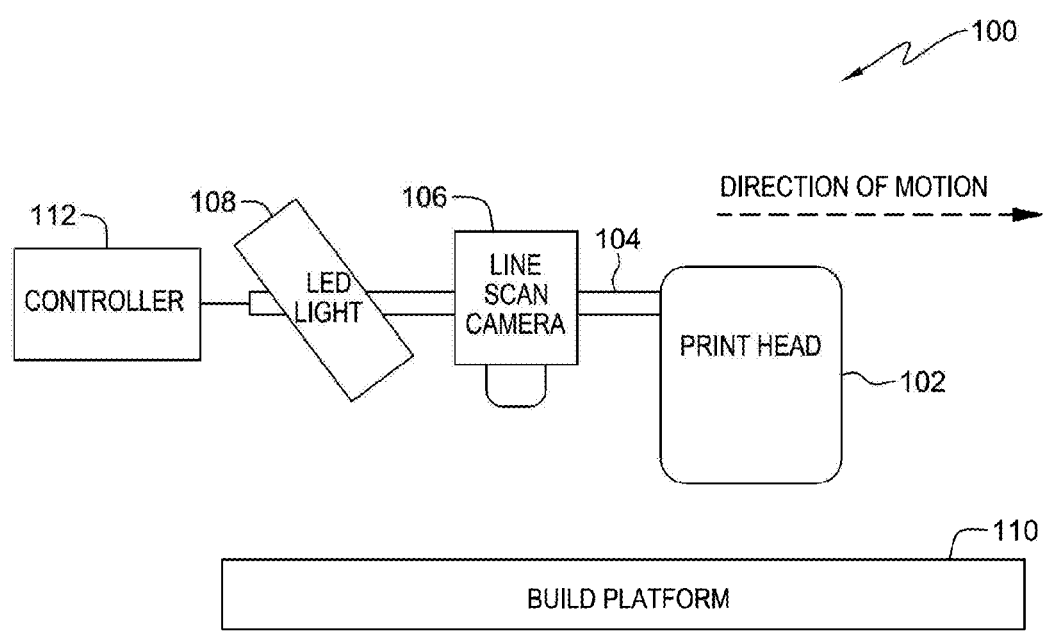
FIG. 1 depicts one example of an additive manufacturing apparatus, in accordance with aspects described herein.

The phrase "additive manufacturing apparatus" is used interchangeably herein with the phrase "printing apparatus" and term "printer", and the term "print" is used interchangeably herein with the word "build", referring to the action for building a structure by an additive manufacturing apparatus, regardless of the particular additive manufacturing technology being used to form the structure. As used herein, print and printing refer to the various forms of additive manufacturing and include three-dimensional (3D) printing or 3D rapid prototyping, as well as sintering or melting/fusing technologies. Examples of additive manufacturing or printing techniques include Fused Deposition Modeling, Electron Beam Melting, Laminated Object Manufacturing, Selective Laser Sintering (including Direct Metal Laser Sintering also referred to as Direct Metal Laser Melting, also referred to as Selective Laser Melting), and Stereolithography among others.

Assurance that a build process is progressing as planned is important for cost and quality reasons. At the end of a build cycle to build one or more three-dimensional structures, an operator of the additive manufacturing apparatus may find that the parts are defective or unusable because of a failure with the additive manufacturing apparatus during the build cycle. This can be especially problematic when building expensive parts, such as molds for casting structures having complex geometries.

A machine vision-based process monitoring system is disclosed herein that may be used to monitor the building of layers of one or more objects being built by an additive manufacturing apparatus, and, in one embodiment, to detect operational flaws as they occur, i.e. during the build process rather than afterward, as an example. In a further embodiment, evaluation/analysis of images acquired during the build process is performed as part of post-processing (and not as part of the real-time acquisition of images). Real-time acquisition as used herein refers to the image capture of individual layer(s) of the structure as the structure is being built ("printed"). Real-time analysis refers to evaluation of the acquired images of the various layers.

Operational flaws may include, as examples, errors with the structure(s), build process, or additive manufacturing apparatus, or indicators that one or more errors are likely to occur with the structure(s), build process, or additive manufacturing apparatus. In some embodiments, action(s) may be taken responsive to observing that an operational flaw has occurred. For instance, remedial actions may be taken so that the flaw can be corrected, the build process stopped, the problem fixed, a new build started, etc.

Provided is an ability to observe a build process that may take hours or days to complete in order to detect and react to potential operational flaws with the additive manufacturing apparatus and/or errors with one or more printed layers. Also provided is the ability to communicate indications of the operational flaws to operators early in the build process as, or before, they occur, so that a failed build can be stopped prior to its completion. A new build may then be started earlier than it otherwise would have been (i.e. had the failure been discovered only after the failed build process completes). From a manufacturing resources perspective, wasted materials usage and wasted build time are reduced. In addition, as described below, rather than stopping an entire build process, printing of individual parts that are showing flaws or otherwise undesired features can be turned off so as the flaws/features do not cause the build to fail, which could cause errors with all of the structures in the build. By terminating building of individual parts that are becoming problematic, manufacturing yields and machine uptime can be maximized.

Some problems that may be observed during the monitoring of a build process as described herein include, but are not limited to, dimensional errors, distortion, or cracking in the printed structures, failed or clogged print jets (nozzles), malfunctioning of a roller/planarizer or other component of the printing apparatus, poor layer surface finish, delamination of the structures, misplacement, excess, or absence of build material, or any other additive manufacturing errors. In general, the monitoring can monitor for anything that can cause the built part to fail or that can indicate that that additive manufacturing apparatus has failed, is about to fail, or needs maintenance, as examples.

An example additive manufacturing apparatus and associated process in accordance with aspects described herein are presented with reference to FIGS. 1-4, in the context of printed disposable dies for casting of parts. The disposable core dies in this example are built out of printed polymer material, though other materials are possible.

In one example, the printing apparatus prints the structures in layers. For the first layer, a print head moves across a build platform and polymer is released onto the build platform at only the correct 'pixel' locations for that layer. A light source with an appropriate wavelength is then passed over the portion that was printed, curing it in place. After this layer is complete, the build platform lowers a distance that is equal to the layer thickness of the build (this is usually predetermined by the operator of the system). Then, the next layer is printed on top of the previous layer, and this cycle continues. It should be noted that such a 3D polymer printing process involving a print head laying down layers on a build platform is distinguished from other forms of additive manufacturing, such as powder-based laser sintering, described in further detail below.

A disposable die may be a very complex structure, having layers in which sections of polymer would be unsupported if printed alone. There may be areas of polymer within a layer that are difficult to print in that there is nothing underlying that area of the layer (i.e. no polymer was printed at that area of the preceding layer). The result is that there is no underlying structure onto which the polymer at that location may be printed. It is not possible to print polymer in mid-air, and so the printer may be configured to print a different material as a support material for the polymer to be printed in subsequent layer(s). This different material may be wax, for example, through wax is not the only kind of support material that could be used. In this case, the printer may print both polymer and wax concurrently, printing the wax only where no polymer is being printed but where a supporting structure is needed for material in an upper layer. When the print process to print the polymer structure is complete, the final as-printed structure may be the polymer structure at least partially encased in wax support material. The wax may then be melted away, leaving the polymer structure behind.

One potential challenge in the above process is distortion of the printed structure. If there are errors in printing—for instance holes in the polymer walls, cracks, or shape distortions, as examples—then the printed structure may not function as intended in its downstream application.

By way of some examples, holes in the polymer structure may be the result of clogged print head jets. The holes may be hard to see with the naked eye but can cause cast material to leak during the casting process, resulting in significant losses in production yields and production time (clean up, refixturing, etc.). Walls on the polymer structure that are too thin can lead to bulging and distortion during the casting process. Furthermore, mixing between the polymer and wax materials (in this example) at the boundaries between them when printed can lead to porosity in the polymer structure and increased surface roughness. This can impact the strength of the polymer die and change characteristics of the casting process, leading to distorted cast structures. The above problems and others may lead to manufacturing failures that may be extremely expensive, for instance when they cause defects in expensive parts being cast from the printed dies. In relation to 3D polymer multijet printing processes, there are no known imaging systems to detect defects on the layer level.

According to aspects described herein, an imaging system is leveraged for monitoring of build quality and machine health during an additive manufacturing process to build a structure, so that the quality of the structure being built and the health of the additive manufacturing apparatus can be assessed. Aspects of the monitoring and analyzing can be performed in real-time, e.g. during the build process. The monitoring includes, in some embodiments, capturing images of the build during the build process (real-time acquisition of images of the build process). This may include, for instance, images of area(s) of the build platform, including images of the individual layers of the structure(s) as the layers are being built, images of one or more additive manufacturing apparatus components, etc., as examples. An assessment of part quality and machine health may then be performed by evaluating the images. For instance, the captured images may be evaluated to ascertain characteristics (dimensions, textures, composition, etc.) of the structure(s) being printed and compare these to a 'golden standard', such as a computer-aided design (CAD) specification for the structure. The CAD specification may be a specification that the additive manufacturing apparatus uses in building the structure. The comparison can assess whether the structure is being built consistent with the CAD specification in order to identify possible distortions, deviations, or other flaws.

Since, build quality is dependent on machine performance, the evaluation of the images can additionally identify features in the images that suggest problems with the additive manufacturing apparatus, such as, in this example in which nozzles deposit print material, a clogged print head nozzle, improperly functioning roller or planarizer, improper surface finishing, or any other observable items that indicate a flaw. Thus, the images can be evaluated to not only detect errors in the structure(s) being built as they are printed, and assign a part 'health' score to the structure(s), but also monitor additive manufacturing apparatus health, indicating when the machine might require maintenance and identifying what is needed for that maintenance. In some examples, the evaluation is performed in real-time during the build process, though in other examples, the evaluation is performed at a later time.

The imaging system or other system for evaluating the images can include customized camera control software and customized defect detection software developed using, for instance, the LabVIEW® graphical development environment (LabVIEW® is a registered trademark of National Instruments Corporation, Austin, Tex.).

When the evaluation of the acquired images reveals a problem, one or more actions may be taken in response, and the types of actions may vary. For instance, an operator of the additive manufacturing apparatus may be notified of the problem. In some embodiments, an auditory or visual alarm or alert, or an electronic communication (i.e. text or email), is provided to the operator indicating that the flaw has occurred. Additionally or alternatively, adjustments may be made to the additive manufacturing process. The process may be halted for instance. In this regard, some errors may be not recoverable, necessitating shut down of the machine in order to allow for operator intervention. However, in some instances, such as if the error is exhibited only when building a particular part or row of parts, the process is modified but not halted altogether; instead, the process is optionally continued to a next phase, skipping the building of object(s) where the operational flaw(s) is/are exhibited. For instance, a 'bad row' of parts or problematic area of the build platform may be noted and the rest of the build may be completed. Noting the bad row may include notifying the operator of the bad row of parts. In further embodiments, the build process may be continued despite observing occurrence of an operational flaw, and, if the error occurs over a substantial area of the build platform or with a threshold number of parts, then the rest of the build may be halted.

Detection algorithms can be used in the evaluation of the acquired images in order to detect the built structure(s), compare them to the CAD model, and identify distortions or deviations in the build structure(s). Early detection of operational flaws may reduce manufacturing time spent on failed part builds, reduce scrap, reduce raw materials usage, and increase up time on additive manufacturing equipment, as examples.

Some of the failure modes identified above may be observable from images taken of the useful parts during building thereof. However, due to geometries of the useful parts or other reasons, it may be difficult to observe some or all of the above failure modes by observation of the useful parts alone. Accordingly, one or more additional structure(s) may be printed to assist in monitoring the health of the additive manufacturing apparatus as the useful parts are built. An example such structure is a calibration target. Another example is a witness fence (also termed a build fence), which is, in one example, an extraneous printed structure not intended for further use beyond its purpose of serving as another observable structure during the print process.

The witness fence may be specially designed into the CAD specification so that each material being printed may have a corresponding portion of the witness fence. In other examples, each material has a corresponding individual witness fence for the material. In this manner, the witness fence becomes another part to be printed at the same time as the other parts. In addition, or as an alternative, to imaging the useful parts being printed, light may be focused on the witness fence, and the light reflecting off of the witness fence may be imaged by one or more cameras. Variations in the reflected light may be identified to indicate operational flaws with the printer, such as a problem with the print head. Also, rough textures on the witness fence may be identified to indicate a problem with the roller(s) or planer(s) of the printer.

One or more cameras may be dedicated to imaging the witness fence, and one or more other cameras may be dedicated to imaging other portions of the build area (i.e. the area where the useful parts are being printed). Alternatively, the witness fence and useful parts may be imaged by the same one or more cameras. Additionally, while aspects are described herein in the context of lights and cameras for process monitoring, other forms of optical and/or acoustic sensing, such as linear photodiode array or ultrasound imaging technologies, are also possible. In one example, high resolution imaging is utilized such that particle size images are obtained. As used herein, the term particle size images refers to high resolution images where the optical resolution is at least on the order of the particle size of the powder used in the process. In one example particle size images refers to optical resolution greater than the particle size enabling sub particle imaging.

FIG. 1 depicts one example of an additive manufacturing apparatus, in accordance with aspects described herein. As is seen in FIG. 1, printing apparatus 100 is a 3D printing device that includes a print head 102 mounted to arm 104. Arm 104 drives the positioning of print head 102 over build platform 110, onto which material is deposited. Print head 102 may include a plurality of print nozzles through which material, e.g. polymer and wax material, is deposited onto build platform 110. Also mounted to arm 104 are line scan camera 106 and light source 108 (in this example a light emitting diode (LED) light source). While a line scan camera is illustrated in this example, other imaging devices can be utilized as detailed herein.

Light source 108 is a light that can be focused into a tight line that can be position so that it overlaps the imaging location of the line scan camera, giving a uniform illumination field for the line scan camera. In one example, printing apparatus 100 is a modified version of a commercially available 3D printer, modified to include one or more cameras and one or more light sources. Example such commercially available 3D printers include those of the ProJet® line of printers offered by 3D Systems Inc., Rock Hill, S.C. (ProJet® is a registered trademark of 3D Systems, Inc.).

Printing apparatus 100 may also include a control system including one or more controller(s) 112, including hardware and/or software for controlling functioning of some or all components of printing apparatus 100. Controller(s) 112 may control, for instance, positioning of print head 102 and/or deposition of materials therefrom, functioning of light 108, and/or functioning of camera 106. In some embodiments, controller(s) 112 include one or more control data processing systems for controlling the print process and behavior of the other hardware of the printing apparatus.

With respect to the mounted camera(s) 106 and light(s) 108, the lighting may be developed and positioned to highlight the particular features of the printed structures (i.e. the useful parts or the witness fence) that are of interest. The camera(s) may be mounted in the vicinity of the build platform, such as an internal camera within the build chamber, and mounted for instance on the arm to which the print head is attached, as in FIG. 1. Additionally or alternatively, camera(s) and/or lighting may be mounted about or adjacent to a build chamber. In some examples, the camera is an external camera that views the build process from outside of the build chamber through, an aperture, door, or window, as examples. Example alternative configurations are depicted in FIGS. 6A-6D.

Various types of cameras may be used. In general, line scan cameras can produce very high resolution images, enabling detection of features that would otherwise go undetected with lower resolution equipment. Many line scan cameras are capable of producing images having resolution of 12 K at 50 um per pixel, though even small pixel width of 5-15 um is possible in some cases. Line scan cameras, however, need to be moved over the area to be imaged. Other types of cameras, such as those of the Digital Single-lens Reflex (DSLR) type, do not need to be moved, can more easily sit outside or stationarily within the build chamber, and can capture images at an angle with specialized lenses. Image resolution, however, is generally not as robust as that of high-end line scan cameras. Accordingly, the particular imaging equipment used may vary depending on the circumstances and desired flaws to monitor.

The camera(s) may capture images in real-time during the build process. The images may then be evaluated, in real time, in one example, using one or more algorithms executed as software on a data processing system. The data processing system may be included as part of the camera, in one example. In other examples, the data processing system is in wired or wireless communication with a camera responsible for acquiring the images, where the camera communicates the images through one or more wired or wireless communication paths to the data processing system. The separate data processing system may be a controller (112) data processing system described above, or may be a different data processing system dedicated to evaluation of the acquired images.

In any case, the data processing system that obtains the images may evaluate the images, either alone or by one or more of various techniques for comparison with one or more 3D CAD models, to determine whether the structure(s) are being printed correctly. In a typical build setup, a designer of the structures to be printed may utilize software to build designs for all of the parts to be printed onto the build platform. Software for controlling the additive manufacturing apparatus may then (offline) 'slice' the 3D models of the structure(s) to be printed into layers, with each layer to be printed as a 'pass' of the print head. In embodiments that include printing of a witness fence, a design for the witness fence may be added by the designer to the CAD file's distribution of parts. In other embodiments, the design for the witness fence may be automatically added to the CAD file absent designer input, and/or the printer may be configured to automatically print a witness fence when other structures are printed. The witness fence model may be sliced into layers along with the other parts, and printed together with those parts.

As described above, in one example, the additive manufacturing apparatus prints two (or more) materials, and in the example of FIGS. 1-4, prints wax and polymer. The particular lighting and imaging techniques used may be tailored based on these materials and the particular structure(s) being printed so that the imaging can most clearly show the materials being used. This can facilitate the detection/identification of the materials and the comparison to the CAD model. The lighting mode used for the useful parts may be different from the lighting mode used for the witness fence. In this manner, different lighting characteristics (orientation, intensity, etc.) may be utilized in order to detect the appropriate features on the different structures. Similarly, lighting for imaging the useful parts as they are built may be tailored around the particular defect(s) desired to be detected. In some examples, standard image processing tools are utilized to perform the evaluation of the images. Regarding the imaging techniques, confocal optics may be tailored to limit the depth of field for the sensing system, eliminating light above the image plane, which can help reduce the effect of sparks and light from plasma that may hover over a melt pool. This may substantially reduce noise and help to improve signal-to-noise ratio.

In the example of FIG. 1, the printer's print head includes one or more rows of jets (nozzles) that print curable material (polymer in this example). An ultraviolet light follows behind these nozzles to cure the material as it is printed. The printer's print head also includes one or more rows of heated jets that print the support material (wax in this example). As the print head traverses the build platform, the control system determines when to activate the deposition of material from the jets. The two materials are deposited nearly simultaneously, where the delay between these two materials being printed is based on the speed of the print head and the distance between the two rows of jets.

The camera(s) mounted onto or about the additive manufacturing apparatus can include one or more witness fence cameras and one or more useful part cameras, which may or may not be the same set of cameras. The cameras can intermittently or periodically acquire still frame images of the build process and/or video of the build process. In some examples, the resolution of the cameras is set to about 25 micrometers per pixel, corresponding approximately to a 2" field of view, though cameras with different resolutions and/or different fields of view may alternatively be used.

A line scan camera is used in the example of FIG. 1. As the print head moves across the build platform depositing material(s), the line scan camera images a single line of pixels, then a next line of pixels, and so on, continuously and very rapidly, and then combines the lines of pixels together to form an image. Additionally or alternatively, area cameras may be used instead of line scan cameras to acquire the images, if desired. In general, different materials will appear differently in the obtained images, thereby enabling a data processing system to evaluate the images.

As noted above, not only may the build of the useful parts be imaged, but the build of the witness fence, in these examples, may also be imaged. The witness fence includes, in one example, adjacent and alternating portions of each material being printed. The witness fence may be imaged and the images evaluated to detect, for instance, clogged print nozzles and/or material mixing. By imaging this witness fences, clogged/failed printer nozzles can be detected and the operators alerted of a problem.

The printer may be configured to build the witness fence(s) as the printer prints rows of material. The witness fence(s) are built vertically, like the other structures being printed. In some embodiments, a witness fence for each material printed spans the entire width of the build platform. The witness fences may be imaged from one or more angles as they are printed, and these images evaluated. Evaluation of the images of the witness fence can include determining whether there are gaps in porosity of the layers of the witness fence. Additionally, air bubbles may be identified. The images can identify areas where the nozzles for a material are printing correctly or whether they are clogged. In examples in which polymer and wax are printed, a witness fence may include of a section of wax, then a section of polymer, then alternating thin sections of wax-polymer-wax-polymer, etc., so that the boundary regions between the printed polymer and wax may be examined to identify mixing of the two materials. Thus, the imaging of the witness fence and evaluation of those images provides another way to assess print quality and additive manufacturing apparatus health.

Figure 2:
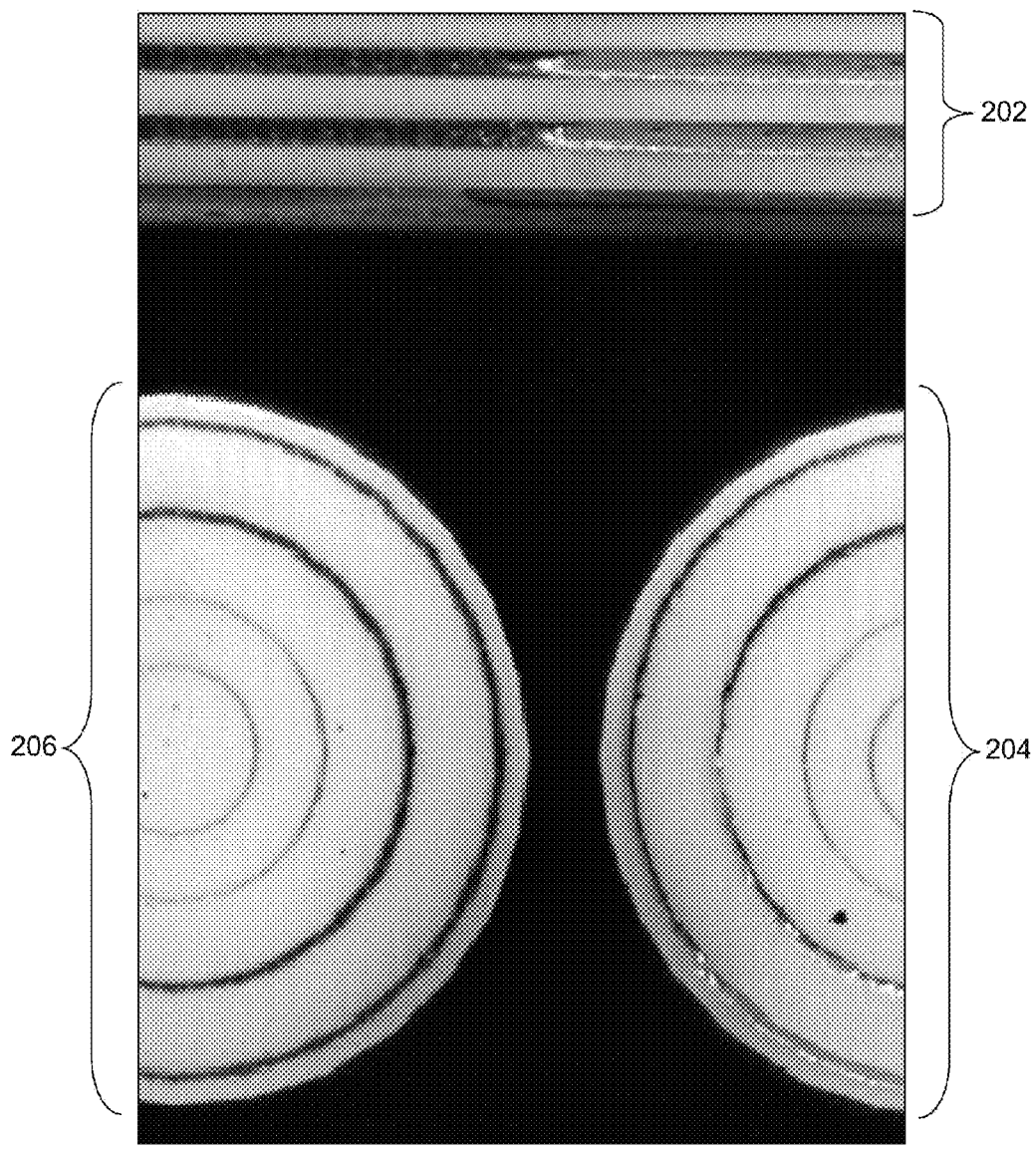
FIG. 2 depicts an image of an area of a build platform having multiple structures printed thereon and exhibiting an operational flaw with the additive manufacturing apparatus, in accordance with aspects described herein.

An example is now described with reference to FIG. 2 that illustrates an overhead image of an area of a build platform having multiple structures printed thereon and exhibiting an operational flaw with the additive manufacturing apparatus, in accordance with aspects described herein. The overhead image of FIG. 2 depicts a portion of witness fence 202 and portions of useful parts 204 and 206 being printed. The printed parts 204, 206 include, in this layer, wax material (lighter, thicker rings) separating polymer portions (darker, thinner rings).

Witness fence 202 extends horizontally across the top portion of the image in FIG. 2, and includes alternating walls of polymer and wax, with the brighter portions being printed wax material, and the darker portions being printed polymer material. The brightest (white) spots indicate where the jets have failed, i.e. spots where a polymer jet clogged and no (or too little) material was printed. The white spots are also visible on printed part 204. Failed jets are just an example of one operational flaw that may be detected by observing the build of the witness fence. Other detectable printing failure mechanisms include misaligned planarizer, wrong planarizer speed, mixing or materials, and wrong volume of material being printed, as examples.

FIGS. 3A & 3B depict images of another example of a witness fence printed by an additive manufacturing apparatus to facilitate operational performance assessment of the additive manufacturing apparatus, in accordance with aspects described herein. FIG. 3A depicts an image of an overhead view of a witness fence. The image of FIG. 3A was taken looking straight (orthogonally) down on the fence, with light incident at 45 degrees from the vertical in the machine direction. FIG. 3B depicts an angled-overhead view of the same witness fence. The image of FIG. 3B was taken using a specular light and the camera held at approximately a 45° angle from vertical.

Referring to FIG. 3A, the witness fence extends from top to bottom (in this image) and includes alternating strips of wax 302a, 302b, 302c, 302d, and polymer 304a, 304b, 304c, 304d. In this example, the witness fence includes (traversing from left to right) a relatively thick strip of wax and relatively thick strip of polymer, then alternating thinner strips of wax-polymer-wax-polymer-wax-polymer.

The white spotting seen in the area marked 306 indicates clogged polymer jets. Also observable in area 306 is a discontinuity in the bright white dashed line separating the polymer strip 304a and thinner wax strip 302b, indicating that, for instance, mixing or insufficient deposition is occurring at the interface between those two printed materials.

Referring to FIG. 3B, when the light reflecting off the witness fence is imaged, shadows will appear at areas where jets failed to print material. Accordingly, area 306 is clearly noticeable as an area of clogged polymer jets, as above.

Area 308 in FIGS. 3A & 3B depicts an engineered gap in the witness fence for testing purposes. This engineered gap may enable development of detection algorithms to detect similar gaps in the witness fence as well as to optimize lighting to optimize (maximize in one example) the contrast of these features. As seen in FIGS. 3A and 3B, the contrast and visibility of these engineered gaps is higher with the specular lighting used in FIG. 3B than with the dark-field lighting used in FIG. 3A.

Both the overhead and the angled-overhead imaging modalities have their own advantages in terms of presenting defects and other indicators of operational flaws in the printing apparatus.

As described herein, layers of a build process may be imaged and the properties and characteristics of the printed materials may be compared to a CAD specification in order to assess the quality of the build and determine whether operational flaw(s) have occurred. The imaging of one or more layers in real time during the additive manufacturing process, and the evaluation of the images, which may be in real-time during the build process or may be at a later time, provides online inspection and process monitoring that facilitates assessment of the operational health of the additive manufacturing apparatus.

Figure 4:
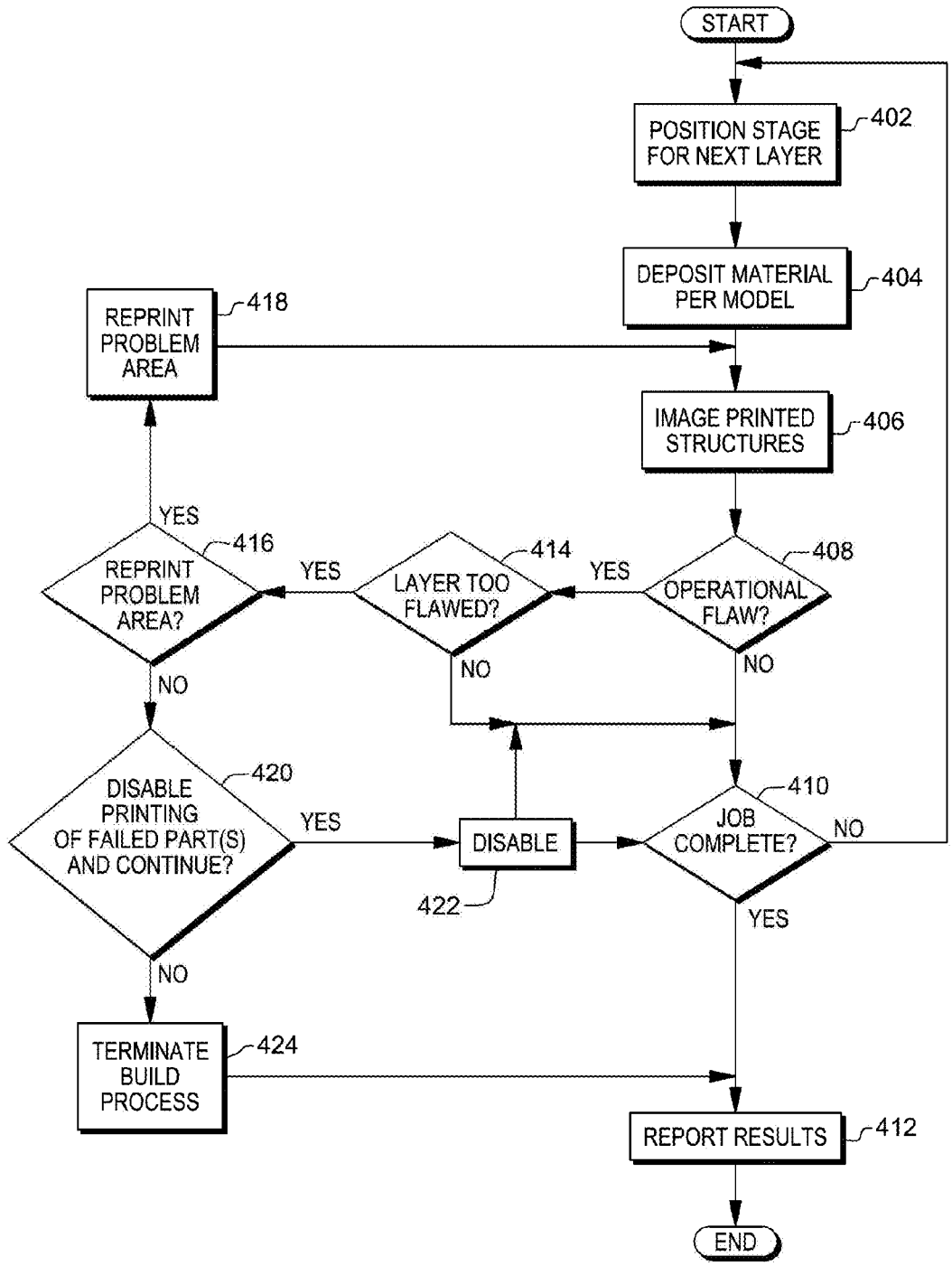
FIG. 4 depicts an example process for building one or more structures using the additive manufacturing apparatus of FIG. 1, in accordance with aspects described herein.

FIG. 4 depicts an example process for building one or more structures using the additive manufacturing apparatus of FIG. 1, in accordance with aspects described herein. The process begins by positioning the stage (build platform) for building the next layer (402), which initially is the first layer of the build. Material for that layer is deposited on the stage, per the specifications of the model of the structure(s) being printed (404). During and/or subsequent to the deposition of material for that layer, the structure(s) being printed are imaged (406) to generate images of the build. It is determined, based on evaluation of those images, whether an operational flaw has occurred (408). As noted above, this determination accounts for both manifested flaws, as well as indication(s) that a flaw may, or is likely to, manifest itself later in the build process.

If no operational flaw is determined to have occurred, the process continues with a determination of whether the job is complete (410). If the job is not complete, meaning additional layer(s) are to be printed, then the process returns to (402) to position the stage for the next layer to be printed. If it is determined that the job is complete, then results of the build may be reported (412). In one example, a report or other indication of job completion is provided to a machine operator or other entity.

If at (408) it was instead determined that an operational flaw has occurred, the process determines whether the exhibited flaw renders the layer (as a whole or where the flaw is exhibited) too flawed to be used (414). In some examples, an operational flaw may be one that places the layer (or portion thereof) out of specification but which is nonetheless acceptable for use, at least at this point in the process. For instance, a minor deformity in a structure may be observed, but it may be deemed an acceptable variance. If the layer is not too flawed, the process continues to (410) to determine whether the job is complete.

If instead it is determined that the layer is too flawed, remedial action(s) may be taken. In this example, a determination is made as to whether to reprint the problem area (416). Reprinting the problem area may be helpful in situations where too little material was deposited at a particular location, which may be the result of a temporarily clogged print nozzle. If it is determined that the problem area is to be reprinted, the reprinting is performed (418), which in some examples necessitates a dynamic adjustment to the print process to effectuate the reprinting of that portion. If reprinting occurs, the process returns to (406) to image the printed structure again and determine whether any operational flaws continue to be exhibited (408).

It may instead be decided at (416) not to reprint the problem area. For instance, if the process already attempted a reprint and the problem continued to manifest itself, it may be unhelpful to attempt another reprint. Alternatively, the flaw in the layer may be one for which reprinting would do no good, as another example. In any case, if reprinting is not to be performed, the process next determines whether to disable printing of the failed part(s) and continue with the print process (420). For various reasons, problems may be indicated by the printing of one or more parts but not one or more other parts of the build process. That is, it may be possible that a problem is exhibited just with respect to a single part, single type of part, particular row(s) of parts, locations of the build platform, etc. In these situations, it might be useful to skip/disable printing of the problematic part(s) but continue the build process with the printing of the remaining parts. Thus, if at (420) printing of the failed part(s) is to be disabled but the process continued, the process continues to (422) by disabling the printing of the failed part(s), and then determining whether the job is complete (410). As before, this modification may require a dynamic adjustment to the build process to effectuate this.

If instead, it is determined at (420) that disabling printing of the failed part(s) and continuance is not to be performed (for instance if the flaw is one that affects all parts of the build or is too fatal to continue), then the build process is terminated (424), and results of the build are reported (412), which might include reporting to a machine operator or other entity that the process was terminated due to the flaw(s) detected.

According to one embodiment, the system comprises a low resolution camera and a high resolution camera. The low resolution camera provides for faster image processing and detection of large scale issues with the 3D printing process. The high resolution cameras then can be used to image the large scale issues to determine the operational flaw or causation thereof in the 3D printing system. In another embodiment, a high resolution camera initially captures images at a lower resolution and once a large scale issue is detected, it then increases the resolution and acquires image(s) as the increased resolution to analyze the issue to determine the operational flaw of the 3D printing system.

Aspects described above apply to other types of additive manufacturing apparatuses and associated additive manufacturing processes. Another example additive manufacturing apparatus and associated process that may be monitored in accordance with aspects described herein is presented with reference to FIGS. 5-8. In this mode of additive manufacturing, the structures are formed by sintering or melting/fusing material by way of an energy source or binding agent to "weld" the material. Those having ordinary skill in the art refer to this process using various names, sometimes dependent on the particular energy source being used. Examples include electron beam melting (eBM), selective laser sintering/melting (SLS/SLM), direct metal laser sintering or direct metal laser melting (DMLM), among others. These processes are referred to interchangeably herein.

In DMLM, as in the previous example, the 3D model of the structure(s) to be printed is broken into slices (layers) for building. Material (metal or ceramic powder, as an example) is delivered, dispersed, and spread to form a material bed, and an energy source, such as a laser, rasters across the material bed, melting the material into the structure being built. Next, the build platform moves down the desired layer thickness (based on the thickness of the slices), additional material is spread, the energy source prints the next layer (on top of the previous layer), and so on.

For embodiments involving metal material, typical energy sources include a laser, directed using a mirror galvanometer (as in DMLM), or an electron Beam (as in eBM). For embodiments involving ceramic powder, a spray epoxy, glue, or other binding agent can bind the ceramic powder to form the structure. Alternatively, ceramic powder may be fused by a laser. In other embodiments, an ultraviolet (UV) light source can be controlled to selectively cure a binder that is already incorporated in the ceramic powder.

In DMLM processes, some systems employ low resolution cameras that are designed to look for large features such as streaks or protrusions. In certain cases such systems provide a scoring or pass/fail analysis that may recoat the layer, but provide no diagnosis. Such systems in DMLM applications are unable to examine the fine features that provide, for example, causality of the defect or operational flaw.

Figure 5:
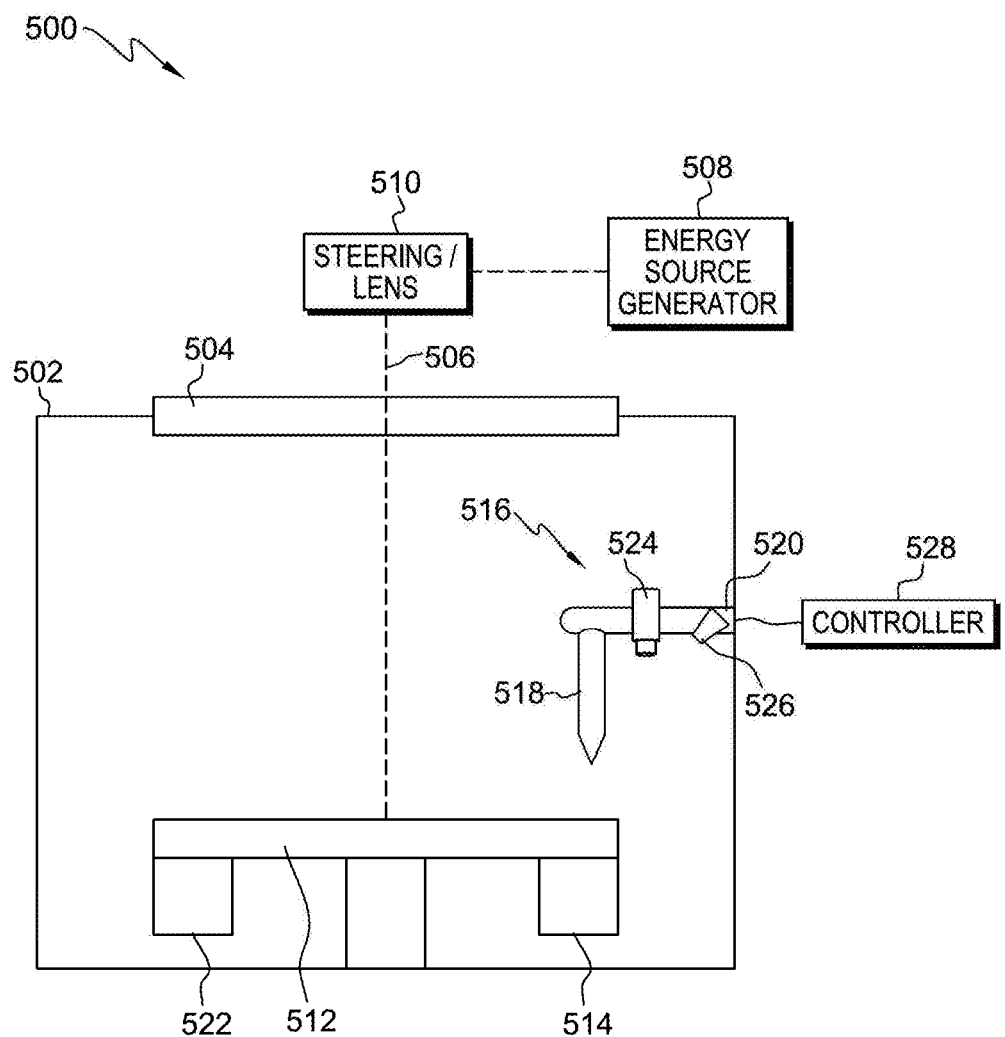
FIG. 5 depicts another example of an additive manufacturing apparatus, in accordance with aspects described herein.

FIG. 5 depicts another example of an additive manufacturing apparatus, in accordance with aspects described herein. The additive manufacturing apparatus of FIG. 5 may be, for instance, a Direct Metal Laser Melting (DMLM) additive manufacturing apparatus.

Referring to FIG. 5, additive manufacturing apparatus 500 includes a build chamber 502 having a window (or aperture) 504 through which an energy source 506 is directed. Energy source 506 may be a laser or electron beam, for instance. Energy source 506 is generated by an energy source generator 508. In this example, the energy source enters a steering/lens component 510 which controls positioning of energy source 506 using mirrors.

Energy source 506 is directed through window 504 into build chamber 502, and more specifically directed to build platform (stage) 512. Build platform 512 has disposed thereon a powder bed of material, and steering/lens component 510 steers energy source 506 toward the powder bed in a precisely controlled fashion to selectively fuse powder of the powder bed in accordance with the specification for the layer being printed.

Material is provided to build platform 512 from a feed container 514. Typically, the feed container pushes powder up onto the build platform. The material must be leveled off to form a substantially flat powder bed. Accordingly, a recoater 516 is provided having a powder spreader (sometimes referred to as a "doctor arm") 518 mounted to arm 520, which moves horizontally (right to left in FIG. 5) across build platform 512 to spread the powder, making a very flat, well controlled powder layer. Excess powder is pushed into an overflow container 522 and recycled for later use. Also mounted to arm 520 are camera 524 and light source 526. Camera 524 is, in some embodiments, a line scan camera or a high resolution camera, and light source 526 is, in some embodiments, a light emitting diode (LED) light source. In one embodiment, the camera 524 is an internal camera mounted within the build chamber. In a further embodiment the camera 524 is an external camera that is mounted outside the build chamber and performs the imaging through a window or door. In yet a further embodiment, there are at least one camera such that the cameras can be internal and/or external. Additionally, the resolution of the cameras can vary such that there can be high resolution and low resolution cameras that cooperate to provide the imaging and can quickly identify gross errors that can then be imaged with a higher resolution.

As before, the additive manufacturing apparatus may also include a control system, in this case one or more controller(s) 528, including hardware and/or software for controlling the functioning of some or all components of apparatus 500. Controller(s) 528 may control, for instance, movement of arm 520, supply of material from feed container 514, functioning of light 526, and/or functioning of camera 524. Controller(s) 528 may also be in communication with energy source generator 508 and/or steering/lens component 510 to control energy source generation (intensity, duration, etc.) and/or steering of the energy source toward the powder bed. In some embodiments, controller(s) 528 include one or more control data processing systems for controlling the build process and behavior of the other hardware of apparatus 500.

In one example, additive manufacturing apparatus 500 is a modified version of a commercially available 3D additive manufacturing apparatus, modified to include one or more cameras and one or more light sources. Example such commercially available additive manufacturing apparatuses include the EOSINT M 280 offered by EOS GmbH, Krailling, Germany; the Phenix line of additive manufacturing apparatuses offered by 3D Systems Inc., Rock Hill, S.C.; and the Arcam A2, offered by Arcam AB, Molndal, Sweden.

As described above, and according to aspects described herein, the imaging components are leveraged to acquire images of the build in real-time during the build process. Evaluation can be performed on the acquired images, which evaluation can be optionally performed in real-time during the build process, as the images are acquired, or at a later time, such as a later point of the build process or after the build process has completed.

Camera 524 can be used to image the powder bed at various times during the build process, for instance as the powder bed is formed (deposition and spreading), after the powder bed is formed but prior to printing the layer, and/or during/after printing the layer, as examples.

In some embodiments, the camera/light may be mounted on a dedicated translation stage/arm rather than on the recoater arm depicted in FIG. 5. Additionally or alternatively, in some embodiments it may be impractical to mount a camera/light inside of the build chamber. In these cases, a camera may be disposed outside of the build chamber and image the build process from an external position, e.g. through an available aperture, lens, or window, for instance. Alternative arrangements are described and depicted with reference to FIGS. 6A-6D. In some examples, the camera is positioned to image the build process through a window in a door of the build chamber. Additionally or alternatively, the camera may image the build process through a window/lens on top of the build chamber.

Figure 6A:
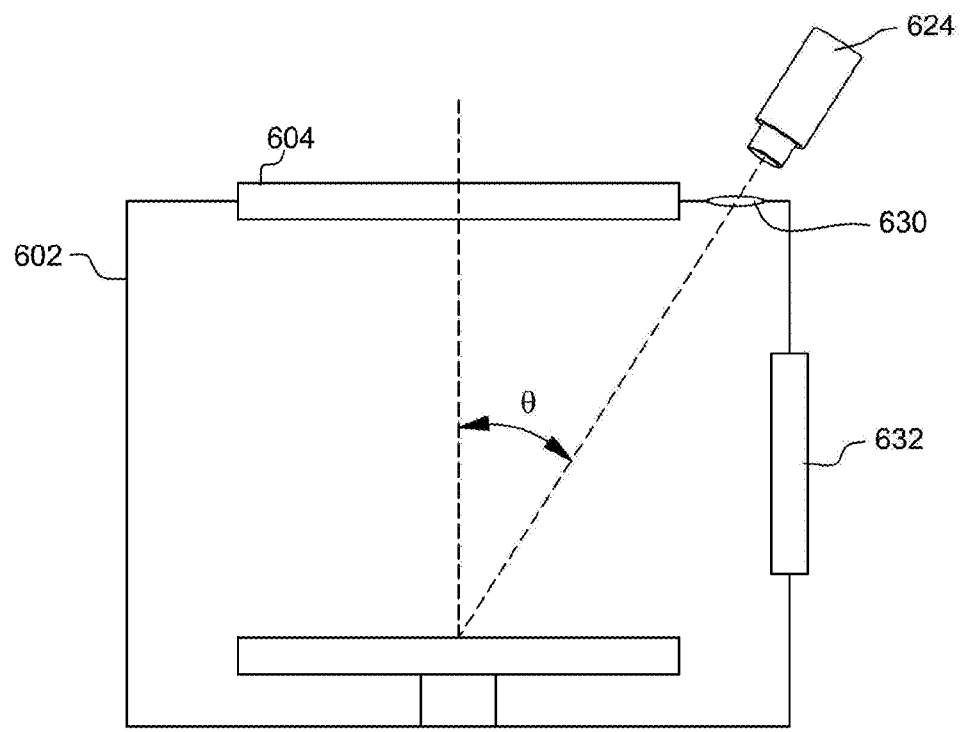
FIGS. 6A-6D depict alternative arrangements for the camera component of the additive manufacturing apparatus of FIG. 5, in accordance with aspects described herein.
Figure 6B:
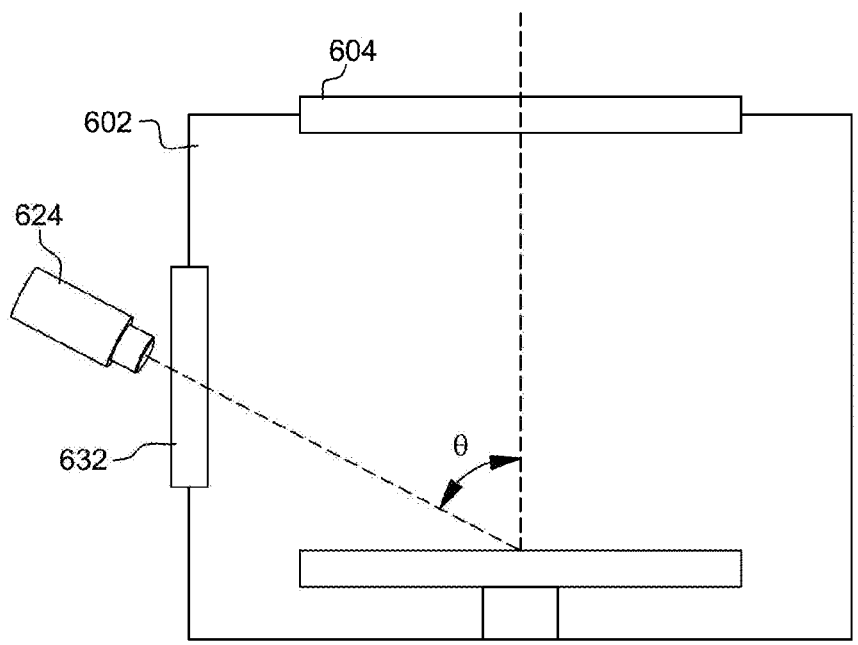

Referring to FIG. 6A, camera 624 images the build process through a window 630 on the top of build chamber 602, which is separate from window 604 through which the energy source (not pictured) is directed to the powder bed. In other examples, camera 624 images the build process through window 604 instead. In FIG. 6B, camera 624 images the build process through a window or door 632 on a side of build chamber 602.

Figure 6C:
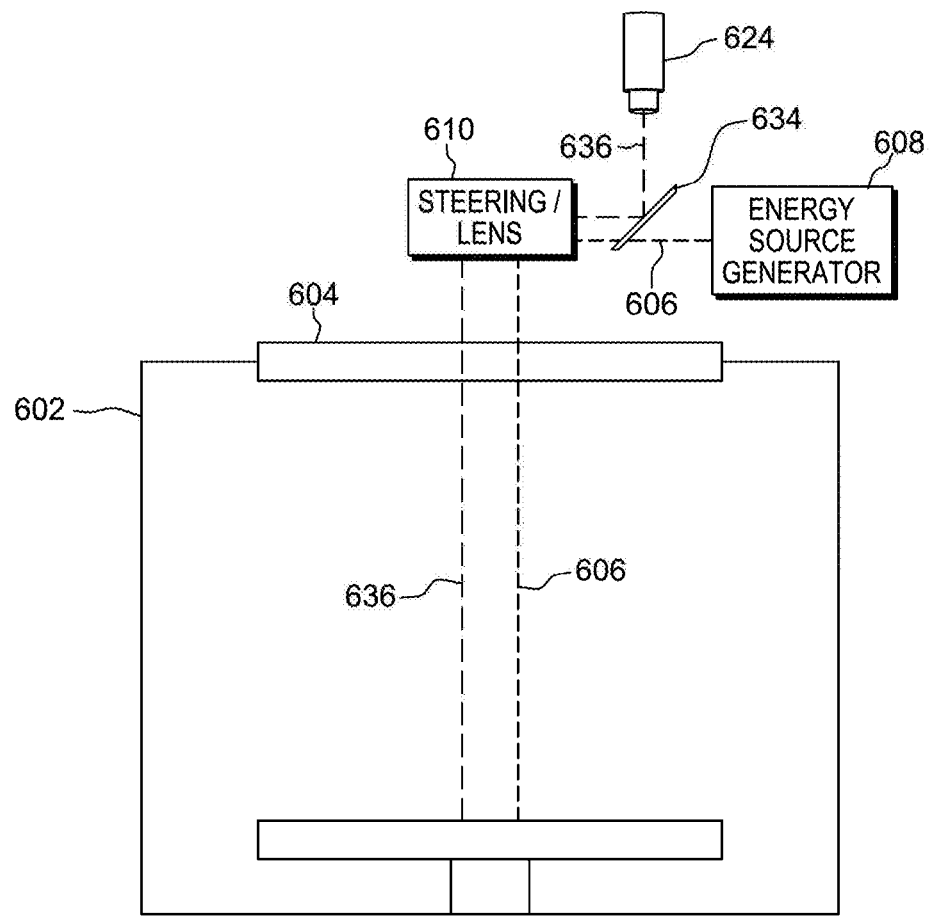

In FIG. 6C, a dichromatic beam splitter 634 is used to provide the camera a view of the build process coaxial to the beam path of the energy source. Dichromatic beam splitter 634 is configured to allow energy source 606 originating from energy source generator 608 to pass through dichromatic beam splitter 634 to steering/lens component 610 for steering to the build platform through window 604. Light originating from one or more light sources (not pictured) either within build chamber 602 or sitting outside thereof, reflects off of the powder bed and structures being printed. Portions of the reflected light 636 travel coaxially (with respect to energy source) back through window 604 into steering/lens component 610, further reflecting back toward dichromatic beam splitter 634. Dichromatic beam splitter 634 is configured to reflect the reflected light 636 toward camera 624 for imaging.

Figure 6D:
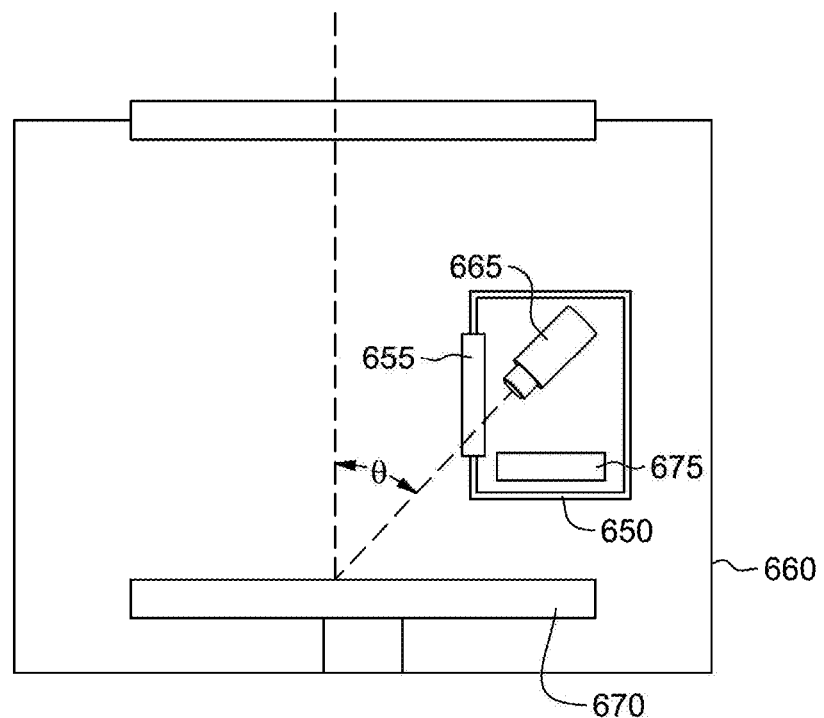

Referring to FIG. 6D, camera 665 is disposed inside an insulated chamber 650 which itself is disposed within build chamber 660. Insulated chamber 650 has a window 655 through which camera 665 images the build process, including the layers of the structure(s) being built as they are constructed on build platform 670. Insulated chamber 650 insulates the contents thereof from the environmental conditions within the build chamber, and consequently, camera 665 is protected from the environmental conditions within build chamber 660 by way of its disposition within insulated chamber 650. In one example the insulated chamber 650 is further includes a cooling unit 675 that is configured to cool camera 665. For example, the cooling unit 675 may employ heat sinks, heat pipes, fans and/or piping for liquid coolant (not pictured) to facilitate maintaining the temperature within insulated chamber 650 at a temperature that permits proper operation of camera 665. With a trend in the industry to run DMLM systems at increasingly higher build chamber temperatures (200° C. to 700° C. in some examples), heat exchanger(s)/chillers may be disposed external to build chamber 660 and in communication with pipes to deliver liquid coolant (such as water) to cooling unit 675. In one particular example, the coolant is supplied around insulated chamber 650 (chamber 650 may be jacketed with a cooling system) to facilitate maintain the chamber/equipment within a desired temperature range. While insulated chamber 650 and camera 665 are disposed in a top corner of build chamber 660, in other embodiments the insulated chamber and camera are disposed elsewhere within build chamber 660.

It is seen that the build process can be imaged from various angles, including coaxial/parallel to the path of the energy source (FIG. 6C) and/or looking orthogonally down on the powder bed from above (FIG. 5). The particular angle at which the build process is being monitored may be tailored depending on the characteristic of the build process (material being used, features of the structures being printed, etc) as well as characteristics of the camera(s) (type, resolution, etc.) and light(s) (type, angle, intensity, etc.) being used.

It should be understood that the imaging component arrangements depicted in FIG. 5, 6A, 6B, 6C or 6D are just examples, and that other arrangements are possible. In some embodiments, two or more cameras are utilized in two or more arrangements, such as those depicted in FIG. 5, 6A, 6B, 6C or 6D.

In operation, area(s) of the build platform, including the powder bed, may be imaged at various times during the build process, for instance after each recoating, when fresh powder is spread, or during/after each pass of the energy source to print (weld) the next layer. The images may be evaluated to assess operational performance of additive manufacturing, for instance to detect undesirable characteristics of the powder bed, including but not limited to streaks, areas of insufficient powder, or protruding features, and to detect properties of the structures being printed.

Thus, operational performance of the additive manufacturing apparatus may be indicated, in part, by the quality of the powder bed after recoating but before the bed is exposed to the energy source. Areas at which too little powder has been spread, creating bald spots or powder starved areas, can negatively affect the build, sometimes resulting in mechanical deficiencies that cause the part to fail. In addition, inconsistencies in the powder bed (thickness, distribution of powder, etc.) can indicate situations where a support structure or part has shifted, causing powder of the powder bed to shift. Knowledge of this can be useful because it can indicate when and how to make the welded structure more structurally robust.

Additionally or alternatively, images obtained during/after welding has taken place may be evaluated to detect properties of the welded structure(s) and identify defects or problem indicators. The detected properties can also be compared to the CAD specification, in order to facilitate identifying defects and/or distortions in the structure(s), as examples, or any other operational flaws with the additive manufacturing apparatus. In manner, assessment of operational performance in the embodiments of FIGS. 5-8 is similar to that of the embodiments of FIGS. 1-4 in that both detect and compare properties of printed/welded structure(s) to the CAD specification of those structure(s) and both assess the health of the additive manufacturing apparatus. Any detected operational flaws may be reported to a machine operator or other entity. Additionally, the acquisition of images may be made in real-time, and the assessment of operational performance may also be made in real-time during the build process or any time thereafter.

Figure 7A:
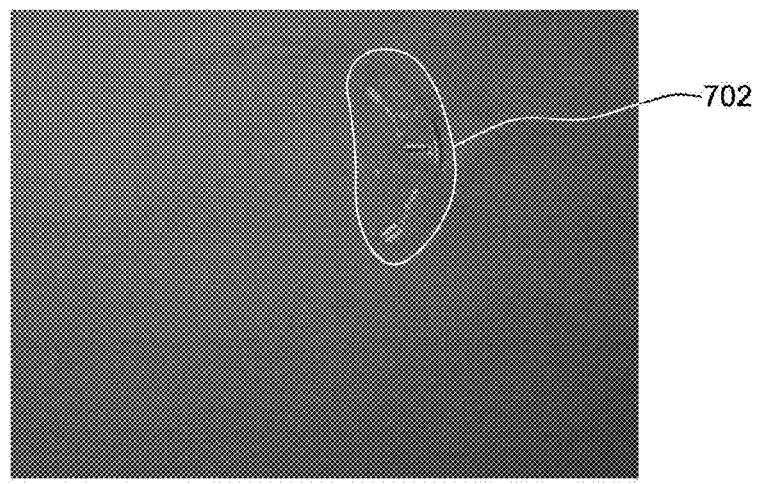
FIGS. 7A-7B depict images of angled-overhead views of an area of a build platform having a powder bed disposed thereon and exhibiting operational flaws with the additive manufacturing apparatus, in accordance with aspects described herein.
Figure 7B:
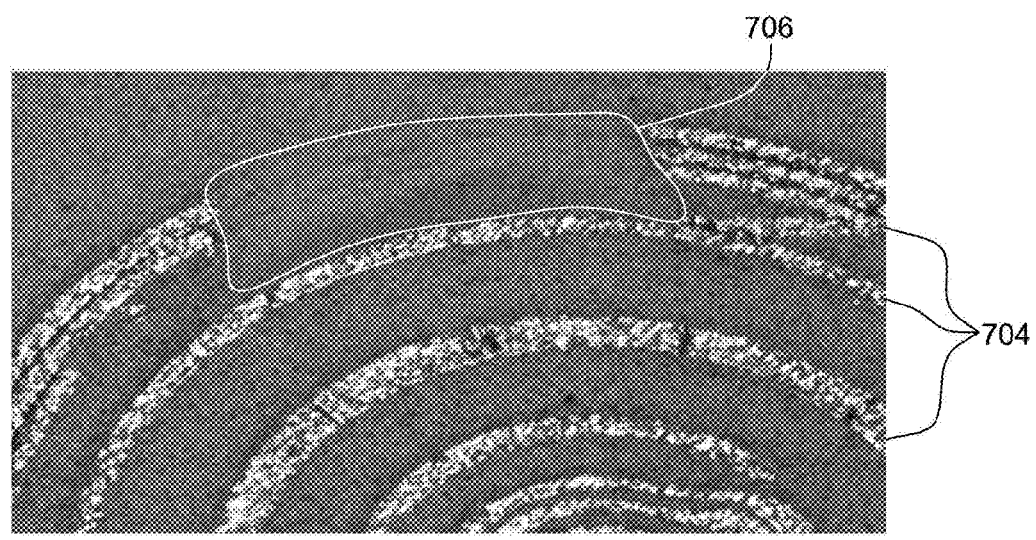

By way of specific examples, FIGS. 7A-7B depict images of angled-overhead views of an area of a build platform having a powder bed disposed thereon and exhibiting operational flaws with the additive manufacturing apparatus, in accordance with aspects described herein. FIG. 7A depicts an image of a powder bed after a recoat. In this example, high resolution camera(s) are used to acquire the image depicted. High resolution in this context can range between 70 micrometers (um) per pixel to 130 um per pixel, depending on the image location on the build platform. The high resolution nature of the imaging system enables the visualization and detection of shadow features and low contrast smears across the powder bed that are indicative of various kinds of failures during the build process. In addition, the high resolution nature of the imaging system also shows characteristic features in the post-welded layer that may also suggest possible problems during the build. Cameras of lower resolution may present images of relatively poor detail, so as to hinder the visibility of, or the ability to detect, the cause of the failure and/or subtle build errors.

The high resolution imaging device allows for particle size imaging, i.e. obtaining particle size images such that the high resolution imaging has optical resolution that is on the order of the particle size of the powder wherein the resolution is so fine that it captures detail of the individual particles of the particle bed. Such imaging enables performance of root cause analysis for failures of the design, apparatus, and/or process. For example, a failure mode across many parts being developed on a build platform where the same feature exceeds dimension tolerances may indicate the design is not robust. In another example, a failure mode that occurs on certain locations on the build platform can be related to machine or apparatus problems that require calibration or maintenance. The prognostic ability to accurately determine the fault increases as the system produces more parts.

With a camera capable of imaging 10-120 microns/pixel (or even finer resolution) across the build area, the images show the fine features that enable the root cause analysis to identify the problem and/or help to optimize the design. In one example of a powder bed application, the particle or grain size is about 30 microns, and the high resolution imaging device uses optical resolution that provides the particle size imaging, i.e. acquisition of images having resolution at or near the particle size such as 30 microns. In another example, the high resolution imaging uses optical resolution that provides particle size imaging much greater than the particle size.

In a line scan camera application, an even greater resolution capability is provided to establish the particle size imaging. In one example, the imaging of the build area using the high resolution imaging device stores about 30 M pixels as compared to about 1 M pixels in lower resolution imaging devices.

In a further application, the system provides the ability to perform low resolution imaging to provide for faster analysis and detection of large gross errors and then selectively switch to high resolution imaging for further processing.

Additionally, lighting intensity, angle, and other characteristics may be tailored to facilitate highlighting features of the powder bed that indicate the presence of operational flaws. In FIG. 7A, the powder bed is generally unvarying except for region 702 which includes lighter streaks where powder above welded material is lacking (thin or non-existent, causing the light to reflect of welded metal rather than powder) and a darker streak. The darker streak may have resulted from one or more of various flaw(s). For instance, it could indicate that the weld bead is reflecting light away from the camera, or could indicate that something is casting a shadow, as examples. In this regard, customized lighting within the build chamber may enable distinguishing between these possibilities. In one example, the darker steak is indicative of a shadow caused by a depression in the powder bed. In some cases. subsurface features may have shifted after fresh powder was delivered, causing the powder to fall off the welded structure and exposing a portion of the subsurface structure, which in turn can cast shadows on the powder bed. The dark streaks in FIG. 7A is representative of this type of build failure, and is detectable with the high resolution imaging.

In other examples, the powder may have become disturbed due to a malfunction of the doctor arm or some other error in the flattening of the bed. In another example, the structure being printed has shifted, resulting in disturbance to the powder to create a depression. In a further example, the shadow is from a dimple where insufficient powder was deposited. In yet another example, the underlying structure itself has a depression in it, causing the depression to be manifested in the powder bed. Regarding the lighter streaks, since there is no (or relatively little) powder at those locations, exposing those areas to the energy source would undesirably attempt to weld already-welded material.

FIG. 7B depicts an image of the build platform after the energy source has welded the layer, but before the next recoating. Lighter areas 704, as in FIG. 7A, depict welded material. Region 706 is much darker and matching in color to the rest of the powder bed surrounding the welded material. The darker area 706 indicates the presence of powder where it should have been welded. This may indicate that excess powder was deposited after welding, or indicate areas where the energy source failed, as examples. In addition, variation in the appearance of the welded structure is observable making the welded surface appear relatively bumpy, rather than completely flat. The shape of the bumps may be determined by the shape of the weld bead, which may be determined by the direction at which the laser was traveling across the powder bed during printing. Custom lighting may be developed and implemented to make the welded structure look uniform, so that the weld bead is impacted by light from all sides.

FIGS. 7A and 7B provide just two examples of operational flaws that may be detected by examining images, still or video, during a build process. They are provided for illustration purposes only; many other examples—both in the features depicted in the images, and the operational flaws associated with those features—are possible.

Figure 8:
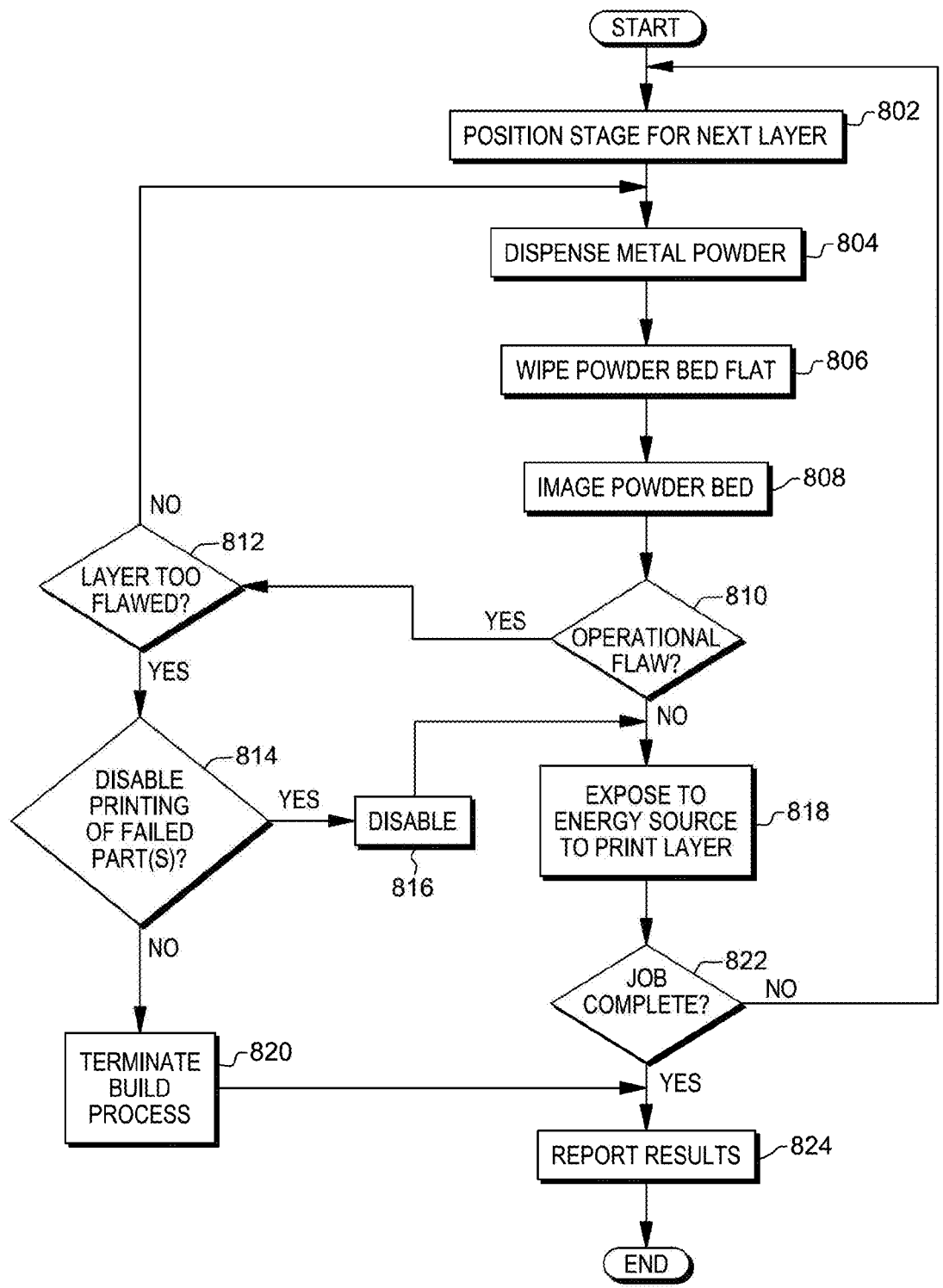
FIG. 8 depicts an example process for building one or more structures using the additive manufacturing apparatus of FIG. 5, in accordance with aspects described herein.

FIG. 8 depicts an example process for building one or more structures using the additive manufacturing apparatus of FIG. 5, in accordance with aspects described herein. In this example, a DMLM build process is performed in which metal powder is welded to form the structure(s). The process begins by positioning the stage (build platform) for building the next layer (802), which initially is the first layer of the build. Metal powder for forming the powder bed is dispensed on the stage (804) and the powder bed is wiped flat (806). At this point, the powder bed is imaged (808) and it is determined whether an operational flaw is exhibited (810), accounting for both a manifested flaw, as well as indication(s) that a flaw may, or is likely to, manifest itself later in the build process. In one example, it is detected whether the powder bed is in a proper condition for printing the layer.

If no operational flaw is detected, the process continues by activating and controlling the energy source to expose the powder bed to the energy source in order to print the layer (818). If instead an operational flaw is detected, the process determines whether the exhibited flaw renders the layer (as a whole or where the flaw is exhibited) too flawed to be used (812). As before, an operational flaw may be one that is non-fatal in the sense that is it acceptable for continued use, at least at this point in the process. Alternatively, it may be a fatal flaw that renders the build (or a portion thereof) unusable. If at (812) it is determined that the layer is not too flawed to be used, then the process can perform a recoat in an attempt to correct the problem, i.e. perform (804) to re-dispense powder, (806) to re-level the powder bed, then re-image the powder bed (808) and reassess whether an operational flaw is exhibited (810).

It may instead be determined at (812) that the layer is too flawed. For instance, the flaw in the layer may be one for which recoating would do no good. Alternatively, if a recoat was already attempted and the problem continued to manifest itself, it may be futile to attempt another recoat. In any case, if it is determined that the layer is too flawed, the process next determines whether to disable printing of the failed part(s) and continue with the print process (814). As before, it may be possible that a problem is exhibited just with respect to a single part, single type of part, particular row(s) of parts, locations of the build platform, etc. If at (814) printing of the failed part(s) is to be disabled but the process continued (for instance to print other areas within that layer), the process continues by disabling the printing of the failed part(s) (816), and then exposing the powder bed (e.g. the other areas thereof) to the energy source to print the layer (818). If instead, it is determined at (814) that disabling printing of the failed part(s) and continuing the process is not to be performed, then the build process is terminated (820), and the results of the build are reported (824), which might include reporting to a machine operator or other entity that the process was terminated due to the flaw(s) detected.

After exposing the material to the energy source to print the layer, the process next determines whether the job is complete (822). If so, results of the build process are reported (824), otherwise the process returns to (802) to position the stage for printing the next layer to be printed.

Though not depicted in FIG. 8, in some embodiments of a process in accordance with aspects described herein, after exposing the material to the energy source to print the layer, areas of the build platform, including the printed structure and/or the remainder of the powder bed, may be imaged to determine whether one or more operational flaw(s) exist. If so, a determination can be made whether to continue the process—perhaps with modifications to disable printing of one or more structures—or terminate the build process if a serious enough problem is presented. Additionally or alternatively, the imaging may be performed at various other points of the process, including simultaneous to the exposure to the energy source to print the layer. At any point, a determination may be made whether to adjust or terminate the build process based on evaluation of the obtained images. Such adjustments may include repeating one or more steps, modifying the process, or omitting one or more steps, as examples.

Figure 9:
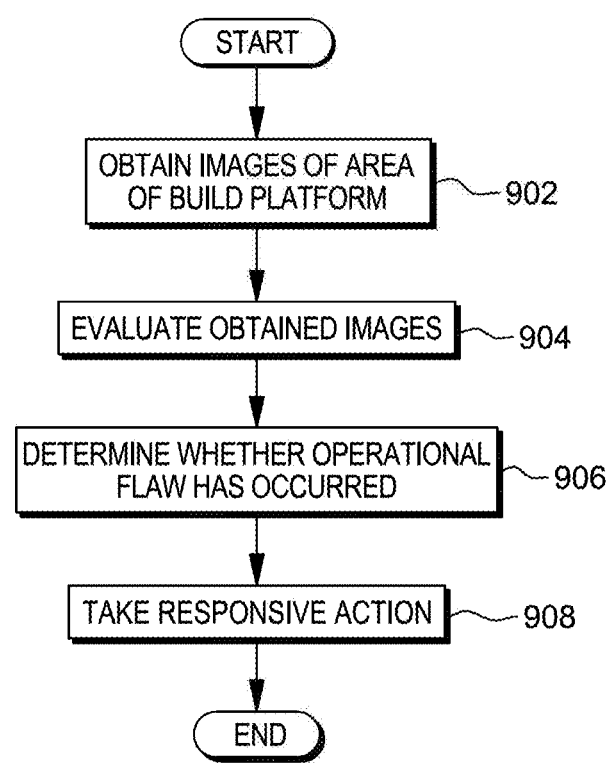
FIG. 9 depicts an example of a process for assessment of operational performance of additive manufacturing during an additive manufacturing build process, in accordance with aspects described herein.

Accordingly, machine vision-based process monitoring systems are disclosed herein for real-time monitoring of a build process by an additive manufacturing apparatus to facilitate assessment of operational performance of additive manufacturing and detect operational flaws as they occur. FIG. 9 depicts an example of a process for assessment of operational performance of additive manufacturing during an additive manufacturing build process, in accordance with aspects described herein. In one example, the process is performed automatically by a data processing system (for instance data processing system 500, described below). The process begins by obtaining images of an area of a build platform (902). The images may be obtained in real-time during a build process in which one or more structures are being built by an additive manufacturing apparatus. In one example, image(s) of each layer or one or more section(s) of each layer are captured in real-time as the layer(s) are printed. In another example, image(s) of only certain (e.g. selected, identified, or specified) layer(s) or section(s) of such layer(s)s are captured in real-time, wherein the layer(s) are imaged and analyzed. Such layer(s) or section(s) may be those that are more prone to errors or defects. It is further noted that the build platform is a platform on which the one or more structures are to be built, and imaging the area of the build platform may include imaging some or all of the build platform, or some or all of the material being printed during the build process.

Images may be obtained at various times during the build process. In some examples, images of the building of each layer are obtained, which includes images of a material bed both before and after the material is fused by an energy source to build a given layer.

Next, some or all of the obtained images are evaluated (904), and it is determined, based on the evaluating, whether an operational flaw of the additive manufacturing apparatus has occurred (906). The evaluating may include performing image processing on the obtained images to, for instance, detect an error in the building of a structure. In some examples, the error is indicative of occurrence of the operational flaw of the additive manufacturing apparatus.

An example additive manufacturing apparatus may include a plurality of nozzles. Some nozzle(s) may deposit different materials than other nozzle(s). For instance, one or more nozzles may deposit a first material and one or more other nozzles may deposit a second material during the print process to print the structure(s). The evaluating may detect an error with at least one nozzle of the plurality of nozzles. The evaluating of the images may detect problems or potential problems with the nozzles, for instance that a nozzle is clogged and/or that mixing of one material with another material is occurring at an interface between the two materials.

The determined operational flaw may indicate that maintenance of the additive manufacturing apparatus is necessary, or that the print process should be aborted or altered based on the flaw that has occurred. Accordingly, the process of FIG. 9 may include, responsive to determining that the operational flaw has occurred, taking responsive action (908). Responsive action may include providing an alert to an operator or user that the operational flaw has occurred. Additionally or alternatively, the responsive action may be to make modifications to the build process, for instance in order to attempt to correct the problem and/or prevent the additive manufacturing apparatus from building a portion of an object which is determined to exhibit the operational flaw, and/or building at a location of the build platform at which the operational flaw is determined to be exhibited. The responsive action may include halting the print process or making process adjustments, for instance repeating steps, omitting steps, and/or performing modified versions of steps. In other examples, when the evaluation and responsive action are taken after the build process completes, the action may include modifying the build process for subsequent runs.

As part of the evaluation of the obtain images, one or more physical properties of a structure, as imaged while it is being built during the build process, may be compared to a CAD specification. The CAD specification may describe one or more 'target properties' for the at least one structure, and the determining can determine, based on the comparison to the CAD specification, whether the structure being built is accurate to the computer-aided design specification.

In some examples, one or more structures to be built include a witness fence to facilitate detecting occurrence of operational flaws of the additive manufacturing apparatus. The witness fence may include alternating rows of different material being printed by the additive manufacturing apparatus during the build process, for instance a first material including build material (such as polymer) for the part, and a second material including a support material (such as wax). The alternating rows of different materials may be of varying thicknesses. In the case where one or more witness fences are built, the area of the build platform being imaged may include the area at which the witness fence is built. In some examples, the structures being built include a witness fence and at least one other structure, and the witness fence may span at least as wide as an area of the build platform at which the at least one other structure is to be built during the build process.

In cases where a witness fence is built, the obtained images may be obtained from a camera or other imaging device that images light reflected off of the witness fence. The evaluating of such images may include observing variations in the reflected light, where variations can indicate a problem with a print head of the additive manufacturing apparatus. In addition, the evaluating of these images may help to assess whether mixing of two or more different materials of the materials being printed occurs at an interface between adjacent rows of the alternating rows of material of the witness fence. Mixing may also indicate that the operational flaw has occurred.

In another example additive manufacturing apparatus, powder material is provided to a build platform during the build process, and a powder bed is formed on the build platform during a recoating procedure. The obtained images can include images of the powder bed after performing the recoating procedure, and the evaluating may evaluate quality of the powder bed to facilitate identifying occurrence of an operational flaw. The evaluating can identify, for instance, an area having a protrusion from the powder bed where a portion of the underlying structure was not properly welded and has begun lifting. The evaluating can identify subsurface features such as depressions in the area of the powder bed that may be indicative of insufficient powder being provided at the area of the powder bed. The depression, in one example, occurs after the delivery of fresh powder that causes powder to fall off the build structure and exposes a portion of the subsurface and results in shadows, which is detectable with a high resolution imaging system.

The build process may also expose the powder bed to an energy source to fuse together powder material of the powder bed. The obtained images may include images of the powder bed after exposing the powder bed to the energy source. In these cases, the evaluating may identify various operational flaws, for instance areas of the powder bed having excess powder material or powder material that was not properly exposed to the energy source, as examples.

Advantageously, by providing imaging device(s) and appropriate lighting, and evaluating images of the build process, operational flaws or either the parts being built or the additive manufacturing apparatus itself, such as part distortion, material mishandling, mixing, problematic print nozzles, excess or lack of material, etc. may be observed and identified. When operational flaws are observed, the build process can be adjusted or halted to prevent further resource waste. Manufacturing costs are reduced by identifying problems as they occur and fixing identified problems earlier in the manufacturing process, which helps reduce the build time spent on failed parts. Longer equipment uptime is provided, thereby facilitating maximizing equipment utilization and minimizing equipment downtime.

Aspects described herein may be embodied in one or more systems, one or more methods and/or one or more computer program products. In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 10:
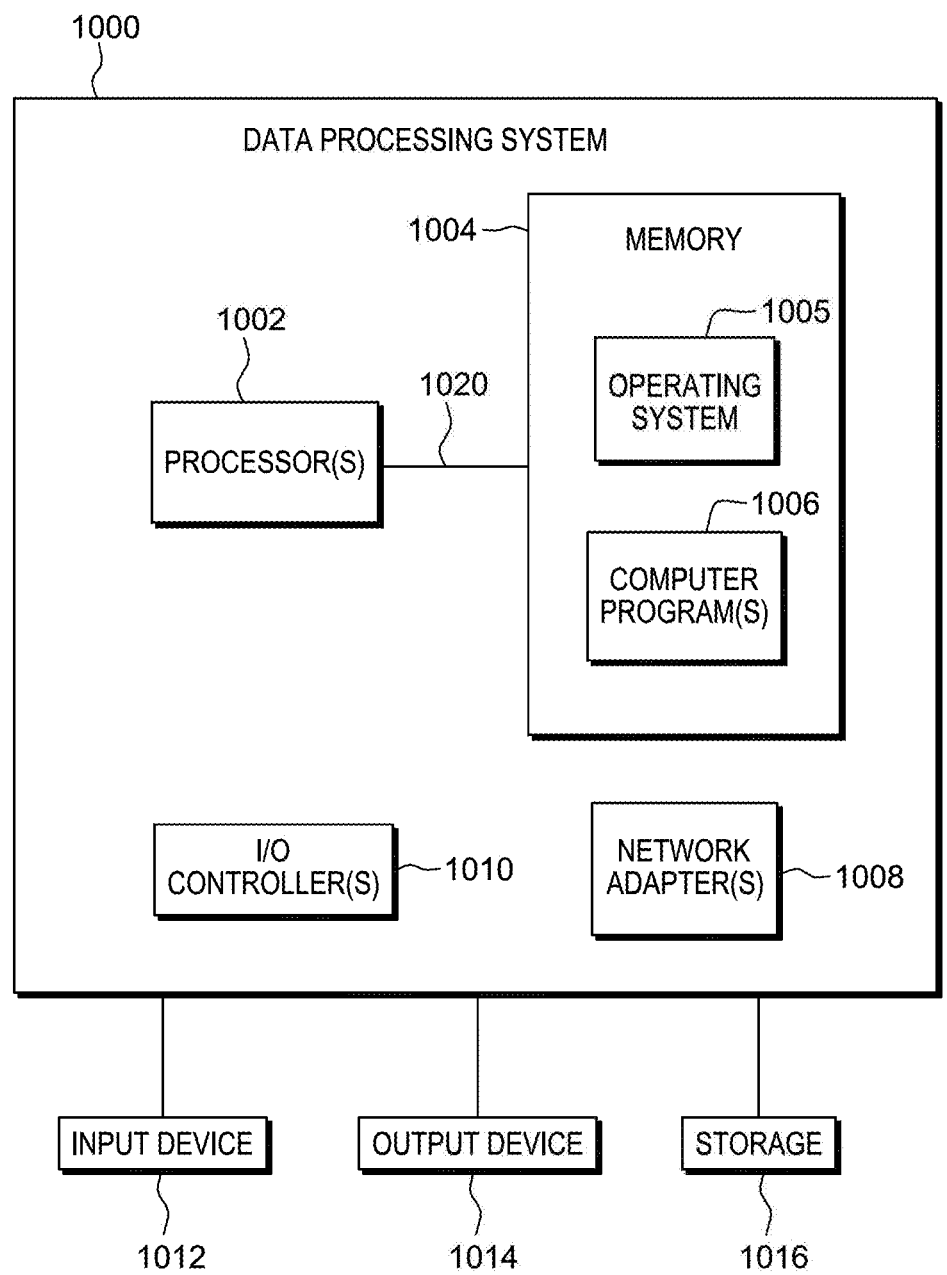
FIG. 10 depicts one example of a data processing system to incorporate and use one or more aspects described herein.

FIG. 10 depicts one example of a data processing system to incorporate and use one or more aspects described herein. Data processing system 1000 is suitable for storing and/or executing program code, such as program code for performing the processes described above, and includes at least one processor 1002 coupled directly or indirectly to memory 1004 through, a bus 1020. In operation, processor(s) 1002 obtain from memory 1004 one or more instructions for execution by the processors. Memory 1004 may include local memory employed during actual execution of the program code, bulk storage, and cache memories which provide temporary storage of at least some program code in order to reduce the number of times code must be retrieved from bulk storage during program code execution. A non-limiting list of examples of memory 1004 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 1004 includes an operating system 1005 and one or more computer programs 1006, such as one or more programs for obtaining images from an imaging device, and one or more programs for evaluating the obtained images to determine whether operational flaws(s) have occurred with an additive manufacturing apparatus, in accordance with aspects described herein.

Input/Output (I/O) devices 1012, 1014 (including but not limited to keyboards, displays, pointing devices, etc.) may be coupled to the system either directly or through I/O controllers 1010.

Network adapters 1008 may also be coupled to the system to enable the data processing system to become coupled to other data processing systems through intervening private or public networks. Modems, cable modem and Ethernet cards are just a few of the currently available types of network adapters 1008. In one example, network adapters 1008 and/or input devices 1012 facilitate obtaining images of a build process in which a three-dimensional structure is printed.

Data processing system 1000 may be coupled to storage 1016 (e.g., a non-volatile storage area, such as magnetic disk drives, optical disk drives, a tape drive, etc.), having one or more databases. Storage 1016 may include an internal storage device or an attached or network accessible storage. Computer programs in storage 1016 may be loaded into memory 1004 and executed by a processor 1002 in a manner known in the art.

Additionally, data processing system 1000 may be communicatively coupled to the camera via one or more communication paths, such as a network communication path, serial connection, or similar, for communicating data between data processing system 1000 and the camera. Communication may include acquisition by the data processing system of the images acquired by the camera.

The data processing system 1000 may include fewer components than illustrated, additional components not illustrated herein, or some combination of the components illustrated and additional components. Data processing system 1000 may include any computing device known in the art, such as a mainframe, server, personal computer, workstation, laptop, handheld computer, telephony device, network appliance, virtualization device, storage controller, etc.

In addition, processes described above may be performed by multiple data processing systems 1000, working as part of a clustered computing environment.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 11:
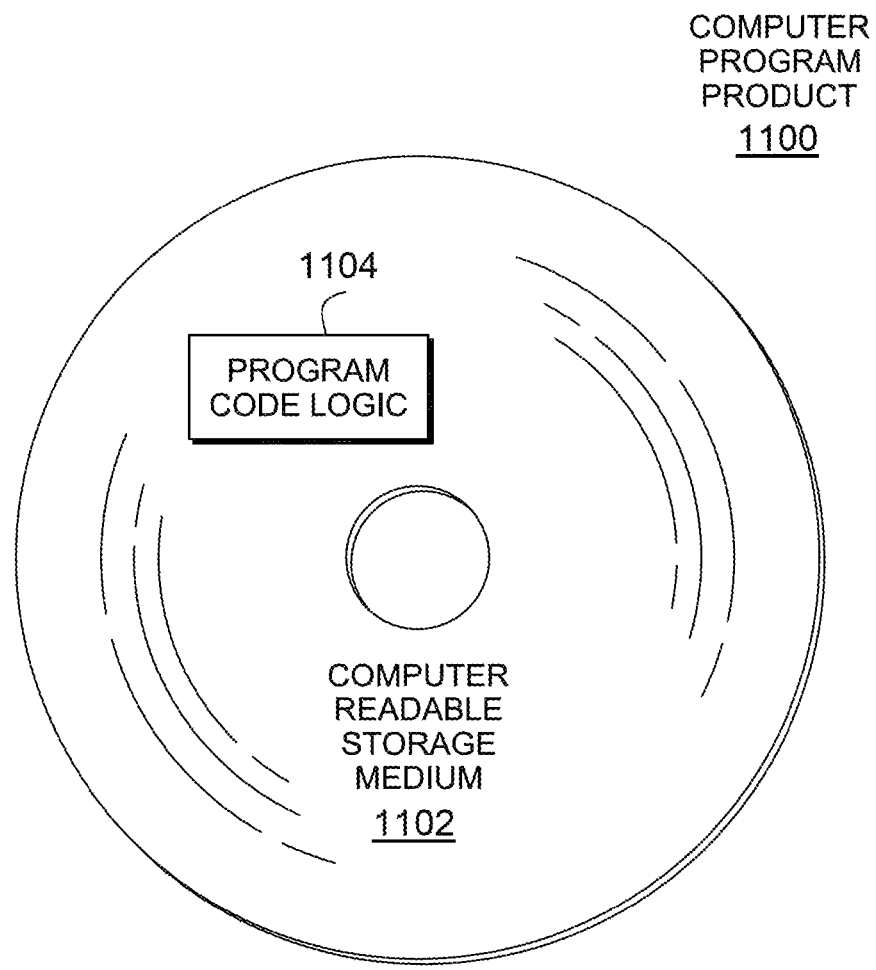
FIG. 11 depicts one example of a computer program product to incorporate one or more aspects described herein.

Referring now to FIG. 11, in one example, a computer program product 1100 includes, for instance, one or more computer readable media 1102 to store computer readable program code means or logic 1104 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

A small sample of technical effects described herein is as follows:

A1. A method for assessment of operational performance of a 3D manufacturing apparatus, the method comprising: obtaining, in real-time during a 3D polymer printing build process in which at least one structure is built by the 3D manufacturing apparatus, images of an area of a build platform on which the at least one structure is built; evaluating, by a processor, the obtained images; and determining, based on the evaluating, whether an operational flaw with the 3D manufacturing apparatus has occurred.

A2. The method of A1, wherein the evaluating comprises performing image processing on the obtained images to detect an error indicative of occurrence of the operational flaw with the 3D manufacturing apparatus.

A3. The method of A1, wherein the determined operational flaw comprises a malfunction of the 3D manufacturing apparatus indicative that maintenance of the 3D manufacturing apparatus is necessary.

A4. The method of A1, further comprising, responsive to determining that the operational flaw has occurred, performing one or more of the following: providing an alert to a user that the operational flaw has occurred, and halting the build process.

A5. The method of A1, further comprising, responsive to determining that the operational flaw has occurred, modifying the build process, wherein the modifying disables (i) building at least a portion of a structure which is determined to exhibit the operational flaw or (ii) building at a location of the build platform at which the operational flaw is determined to be exhibited.

A6. The method of A1, wherein the evaluating further comprises comparing one or more physical properties of the at least one structure as it is being built during the build process to a computer-aided design specification describing one or more target properties for the at least one structure, and wherein the determining comprises determining, based on the comparison, whether the structure being built is accurate to the computer-aided design specification.

A7. The method of A1, wherein the 3D manufacturing apparatus comprises a plurality of nozzles, and wherein the evaluating detects an error associated with at least one nozzle.

A8. The method of A7, wherein the error comprises the at least one nozzle being clogged.

A9. The method of A7, wherein one or more nozzles of the plurality of nozzles deposit a first material during the build process and one or more other nozzles of the plurality of nozzles deposit a second material during the build process, and wherein the error comprises mixing of the first material and the second material at an interface between the first material and the second material in the built at least one structure.

A10. The method of A1, wherein a structure of the at least one structure being built comprises a witness fence to facilitate detecting occurrence of operational flaws of the 3D manufacturing apparatus, wherein the witness fence comprises alternating rows of a first material and a second material being deposited by the 3D manufacturing apparatus during the build process, and wherein the area of the build platform being imaged comprises the witness fence during building thereof.

A11. The method of A10, wherein the alternating rows of first material and second material are of varying thicknesses.

A12. The method of A10, wherein the evaluating assesses whether mixing of the first material and second material occurs at an interface between adjacent rows of the alternating rows of first material and second material, wherein the mixing indicates that the operational flaw has occurred.

A13. The method of A1, wherein said obtained images are high resolution images.

A14. The method of A1, wherein said obtained images comprise high resolution images and low resolution images, and wherein the low resolution images are used to determine that a large scale issue with the 3D manufacturing apparatus has occurred, and the high resolution images are used to determine the operational flaw.

B15. A system for assessment of operational performance of an additive manufacturing apparatus, the system comprising: a memory; and a processor in communication with the memory, wherein the system is configured to perform: obtaining, in real-time during an additive manufacturing build process in which at least one structure is built by the additive manufacturing apparatus, images of an area of a build platform on which the at least one structure is built; evaluating, by a processor, the obtained images; and determining, based on the evaluating, whether an operational flaw with the additive manufacturing apparatus has occurred.

B16. The system of B15, wherein the system further comprises one or more cameras for acquiring the images of the area of the build platform, wherein at least one camera of the one or more cameras is a high resolution imaging camera.

B17. The method of B16, wherein the at least one high resolution imaging camera is configured to capture images having image resolution between 70 micrometers (um) per pixel and 130 um per pixel.

B18. The system of B16, wherein said at least one high resolution imaging camera is configured to obtain low resolution images and high resolution images.

B19. The system of B16, wherein at least one camera of the one or more cameras is a low resolution imaging camera.

B20. The system of B16, wherein the one or more cameras comprise at least one low resolution imaging camera and at least one high resolution imaging camera.

B21. The system of B16, wherein at least one camera of the one or more cameras is an internal camera disposed within a build chamber of the additive manufacturing apparatus.

B22. The system of B16, wherein at least one camera of the one or more cameras is an internal camera disposed within an insulated chamber, the insulated chamber disposed at least partially within a build chamber of the additive manufacturing apparatus, and wherein the insulated chamber comprises a cooling component configured to control temperature of the at least one camera during operation thereof B23. The system of B16, wherein at least one camera of the one or more cameras is an external camera disposed external to a build chamber of the additive manufacturing apparatus, wherein the at least one external camera images the area of the build platform through a door or window of the additive manufacturing apparatus.

C24. A computer program product for assessment of operational performance of a 3D manufacturing apparatus, the computer program product comprising: a non-transitory computer readable storage medium readable by a processor and storing instructions for execution by the process to perform a method comprising: obtaining, in real-time during a 3D polymer printing build process in which at least one structure is built by the 3D manufacturing apparatus, images of an area of a build platform on which the at least one structure is built; evaluating the obtained images; and determining, based on the evaluating, whether an operational flaw with the 3D manufacturing apparatus has occurred.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed. Additionally, the terms "determine" or "determining" as used herein can include, e.g. in situations where a processor performs the determining, performing one or more calculations or mathematical operations to obtain a result.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for assessment of operational performance of a 3D manufacturing apparatus, the method comprising:
   obtaining, in real-time during a 3D polymer printing build process in which at least one structure is built by the 3D manufacturing apparatus, images of an area of a build platform on which the at least one structure is built;
   evaluating, by a processor, the obtained images;
   determining, based on the evaluating, whether an operational flaw with the 3D manufacturing apparatus has occurred, further comprising, responsive to determining that the operational flaw has occurred, modifying the build process, wherein the modifying disables building a portion of a structure which is determined to exhibit the operational flaw; and
   continuing the build process on a remaining portion of the structure that does not exhibit the operational flaw.

2. The method of claim 1, wherein the evaluating further comprises comparing one or more physical properties of the at least one structure as it is being built during the build process to a computer-aided design specification describing one or more target properties for the at least one structure, and wherein the determining comprises determining, based on the comparison, whether the structure being built is accurate to the computer-aided design specification.

3. The method of claim 1, wherein the 3D manufacturing apparatus comprises a plurality of nozzles, and wherein the evaluating detects an error associated with at least one nozzle.

4. The method of claim 3, wherein the error comprises the at least one nozzle being clogged.

5. The method of claim 3, wherein one or more nozzles of the plurality of nozzles deposit a first material during the build process and one or more other nozzles of the plurality of nozzles deposit a second material during the build process, and wherein the error comprises mixing of the first material and the second material at an interface between the first material and the second material in the built at least one structure.

6. The method of claim 1, wherein a structure of the at least one structure being built comprises a witness fence to facilitate detecting occurrence of operational flaws of the 3D manufacturing apparatus, wherein the witness fence comprises alternating rows of a first material and a second material being deposited by the 3D manufacturing apparatus during the build process, and wherein the area of the build platform being imaged comprises the witness fence during building thereof.

7. The method of claim 6, wherein the alternating rows of first material and second material are of varying thicknesses.

8. The method of claim 6, wherein the evaluating assesses whether mixing of the first material and second material occurs at an interface between adjacent rows of the alternating rows of first material and second material, wherein the mixing indicates that the operational flaw has occurred.

9. The method of claim 1, wherein said obtained images are high resolution images.

10. The method of claim 1, wherein said obtained images comprise high resolution images and low resolution images, and wherein the low resolution images are used to determine that a large scale issue with the 3D manufacturing apparatus has occurred, and the high resolution images are used to determine the operational flaw.

11. A system for assessment of operational performance of an additive manufacturing apparatus, the system comprising:
   a memory; and
   a processor in communication with the memory, wherein the system is configured to perform:
      obtaining, in real-time during an additive manufacturing build process in which at least one structure is built by the additive manufacturing apparatus, images of an area of a build platform on which the at least one structure is built;
      evaluating, by a processor, the obtained images;
      determining, based on the evaluating, whether an operational flaw with the additive manufacturing apparatus has occurred; and
      responsive to determining that the operational flaw has occurred, modifying the build process, wherein the modifying disables building a portion of a structure which is determined to exhibit the operational flaw; and
      continuing the build process on a remaining portion of the structure that does not exhibit the operational flaw.

12. The system of claim 11, wherein the system further comprises one or more cameras for acquiring the images of the area of the build platform, wherein at least one camera of the one or more cameras is a high resolution imaging camera.

13. The system of claim 12, wherein the at least one high resolution imaging camera is configured to capture images having image resolution between 70 micrometers (μm) per pixel and 130 μm per pixel.

14. The system of claim 12, wherein said at least one high resolution imaging camera is configured to obtain low resolution images and high resolution images.

15. The system of claim 12, wherein at least one camera of the one or more cameras is a low resolution imaging camera.

16. The system of claim 12, wherein the one or more cameras comprise at least one low resolution imaging camera and at least one high resolution imaging camera.

17. The system of claim 12, wherein at least one camera of the one or more cameras is an internal camera disposed within a build chamber of the additive manufacturing apparatus.

18. The system of claim 12, wherein at least one camera of the one or more cameras is an internal camera disposed within an insulated chamber, the insulated chamber disposed at least partially within a build chamber of the additive manufacturing apparatus, and wherein the insulated chamber comprises a cooling component configured to control temperature of the at least one camera during operation thereof.

19. The system of claim 12, wherein at least one camera of the one or more cameras is an external camera disposed external to a build chamber of the additive manufacturing apparatus, wherein the at least one external camera images the area of the build platform through a door or window of the additive manufacturing apparatus.

20. A computer program product for assessment of operational performance of a 3D manufacturing apparatus, the computer program product comprising:
a non-transitory computer readable storage medium readable by a processor and storing instructions for execution by the process to perform a method comprising:
obtaining, in real-time during a 3D polymer printing build process in which at least one structure is built by the 3D manufacturing apparatus, images of an area of a build platform on which the at least one structure is built;
evaluating the obtained images;
determining, based on the evaluating, whether an operational flaw with the 3D manufacturing apparatus has occurred; and
responsive to determining that the operational flaw has occurred, modifying the build process, wherein the modifying disables building a portion of a structure which is determined to exhibit the operational flaw; and
continuing the build process on a remaining portion of the structure that does not exhibit the operational flaw.

21. The method of claim 1, wherein the evaluating comprises performing image processing on the obtained images to detect an error indicative of occurrence of the operational flaw with the 3D manufacturing apparatus.

22. The method of claim 1, wherein the determined operational flaw comprises a malfunction of the 3D manufacturing apparatus indicative that maintenance of the 3D manufacturing apparatus is necessary.

23. The method of claim 1, further comprising, responsive to determining that the operational flaw has occurred, performing one or more of the following: providing an alert to a user that the operational flaw has occurred, and halting the build process.

* * * * *